Jan. 24, 1928.
B. A. PETERSON
1,657,407
METHOD OF AND MEANS FOR TYING WEAVERS' KNOTS
Filed Oct. 1, 1923 13 Sheets-Sheet 7
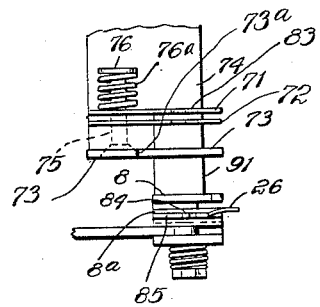
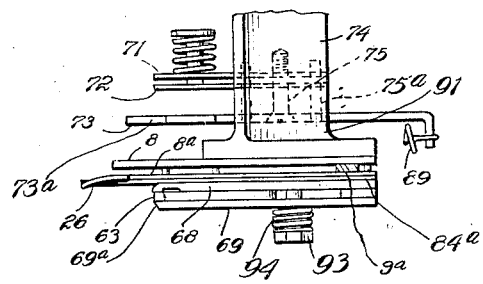
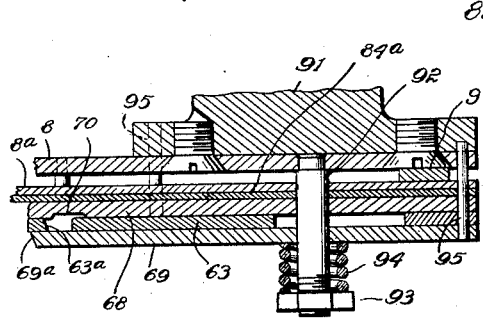
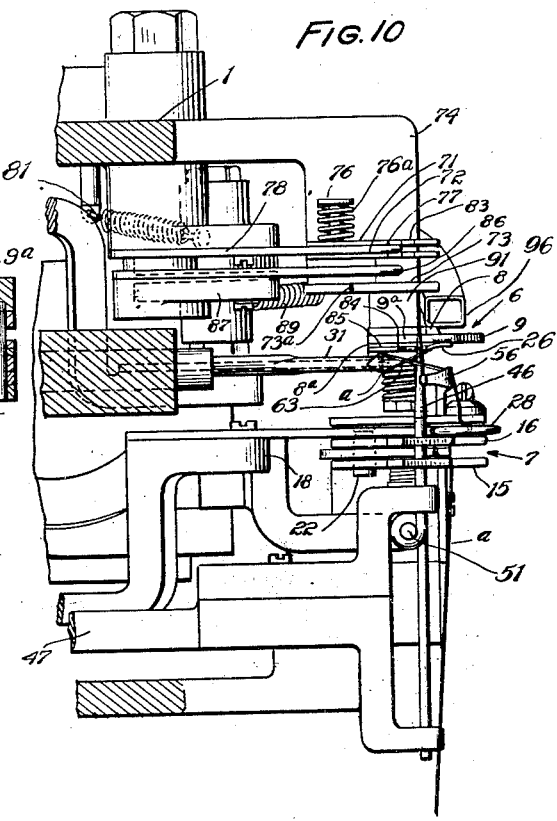
Inventor
B. A. Peterson
By Chindahl, Parker & Carlson
Attys

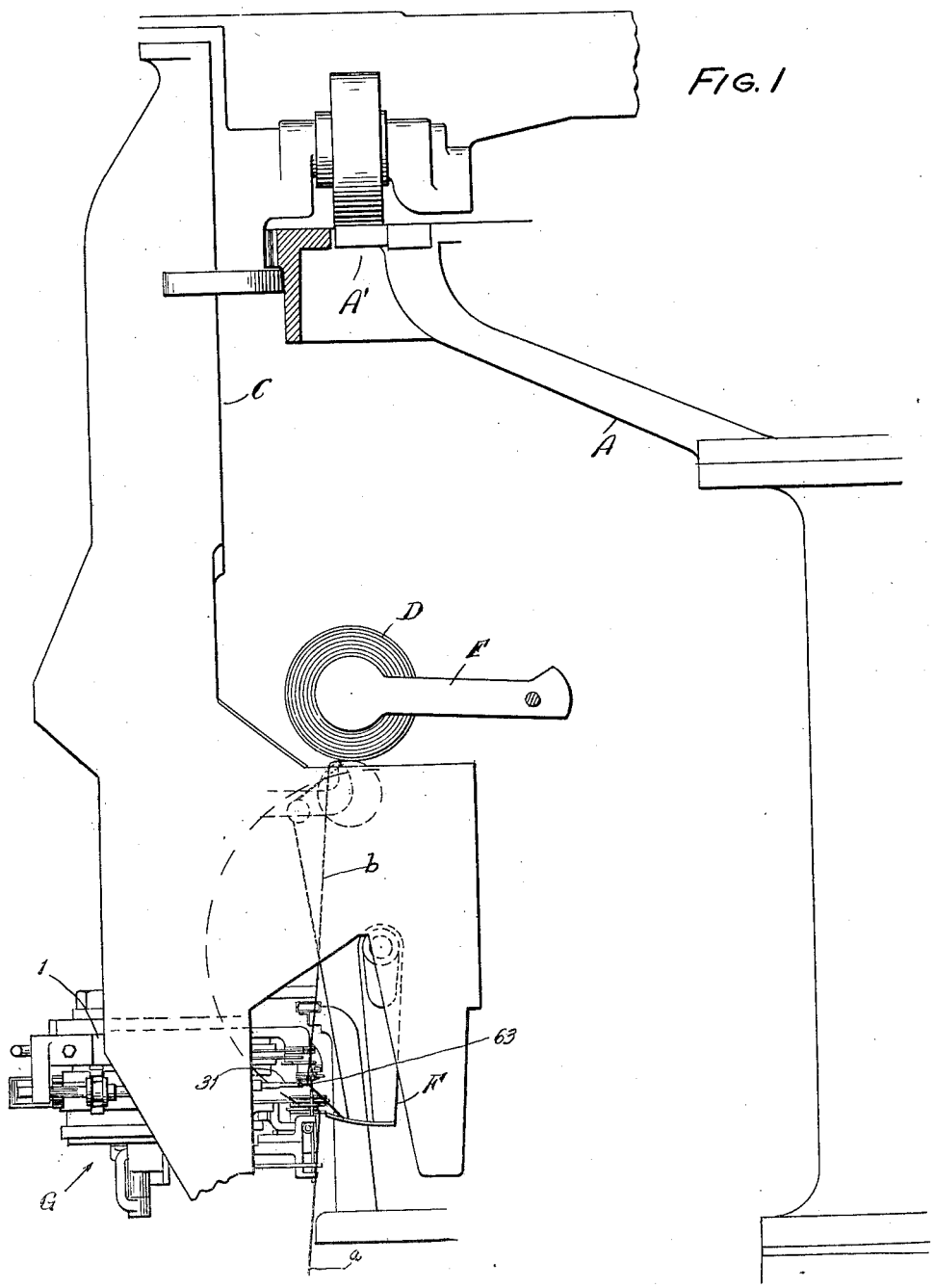

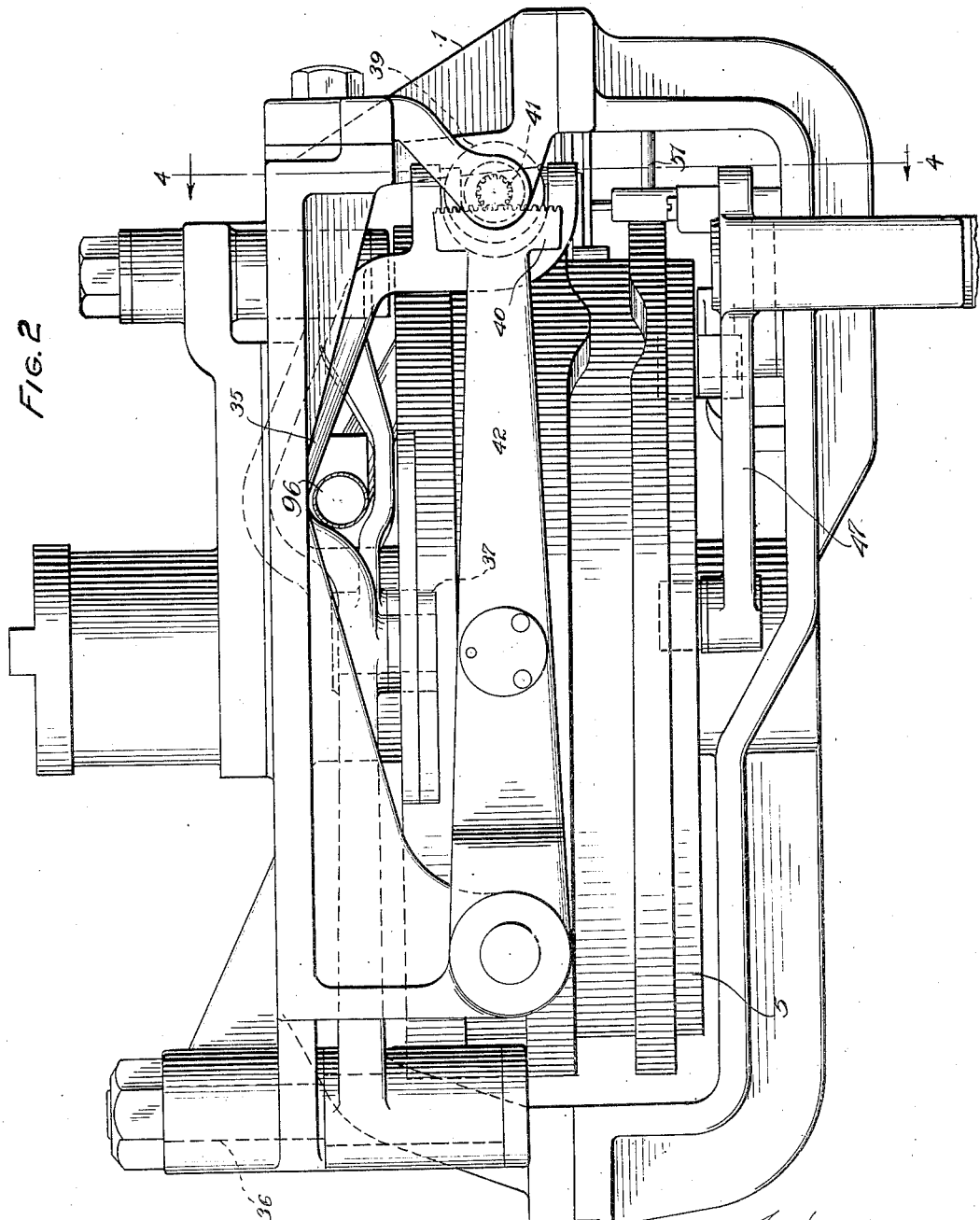

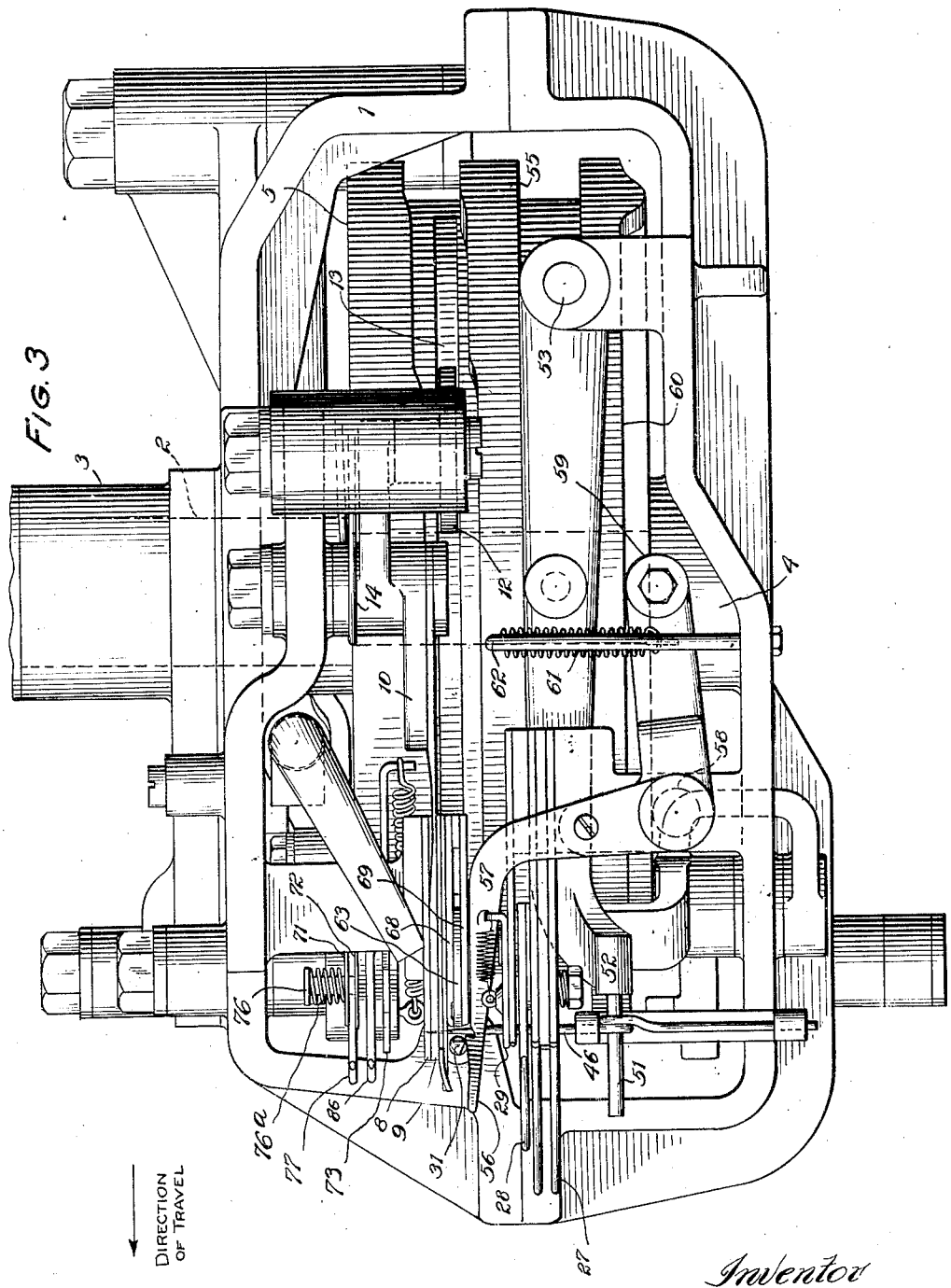

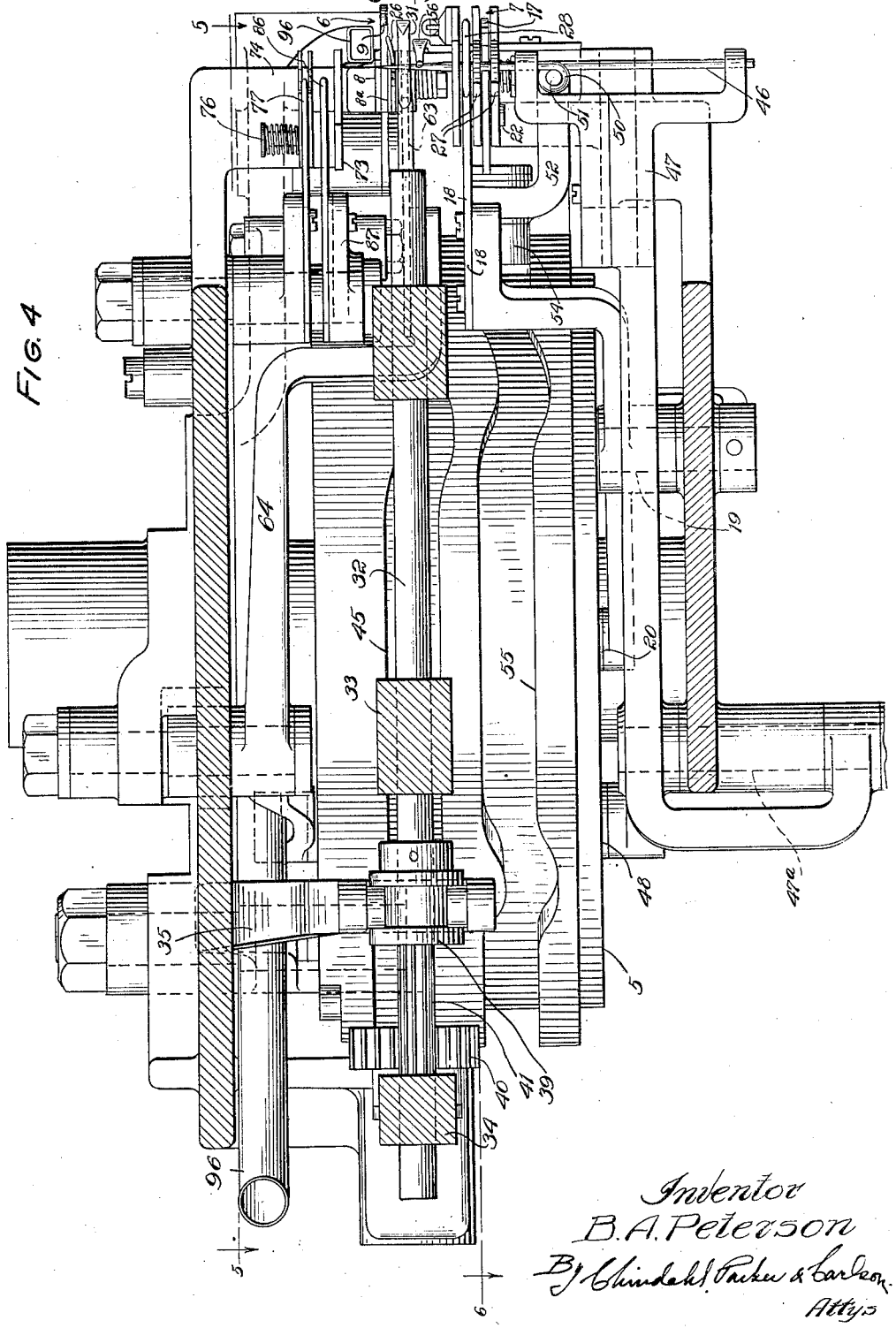

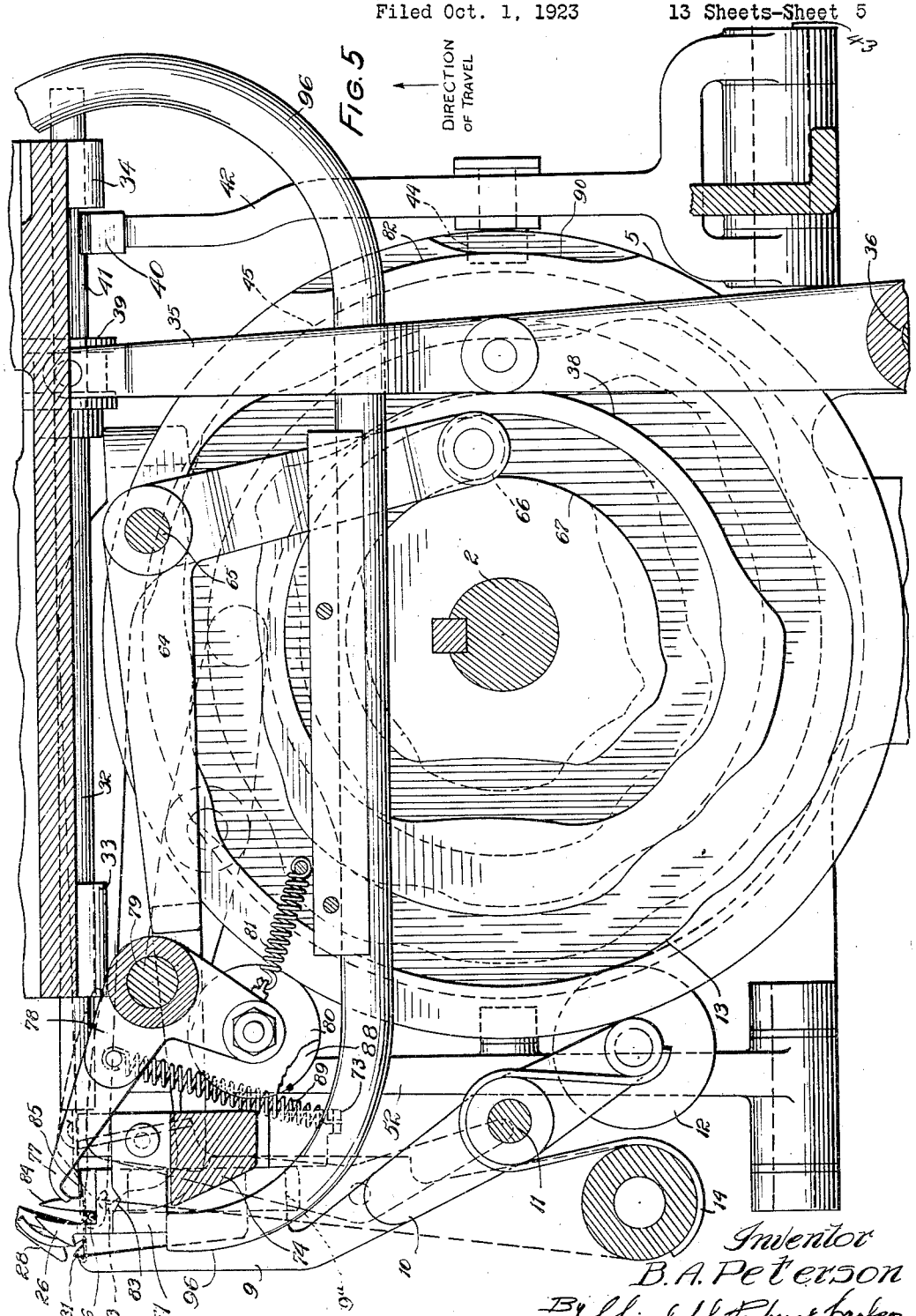

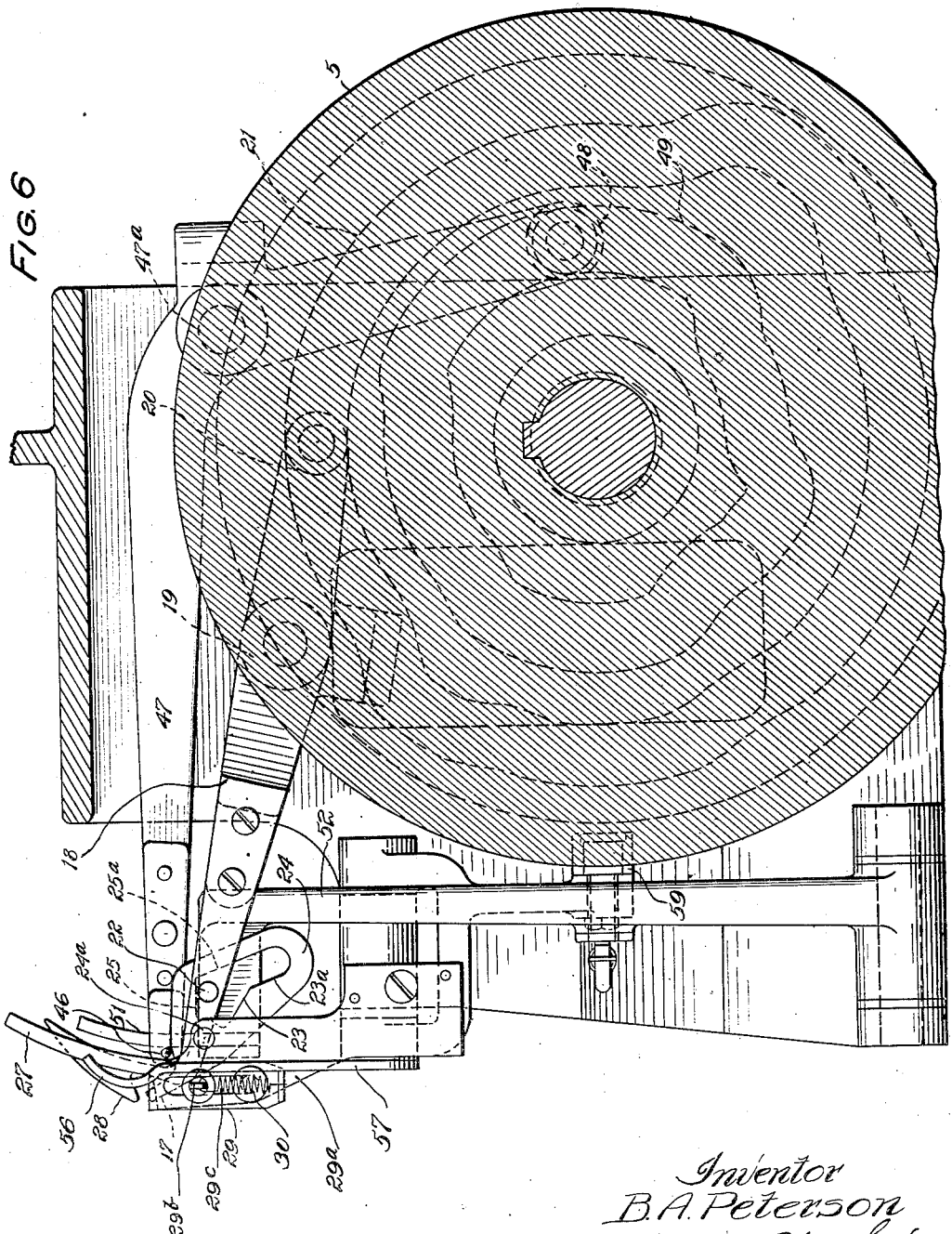

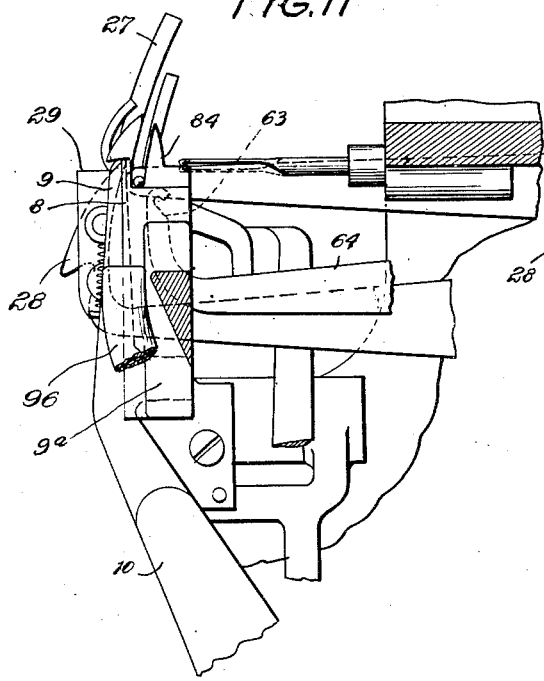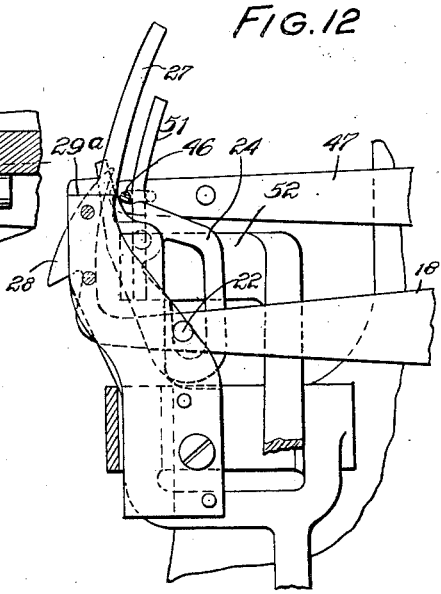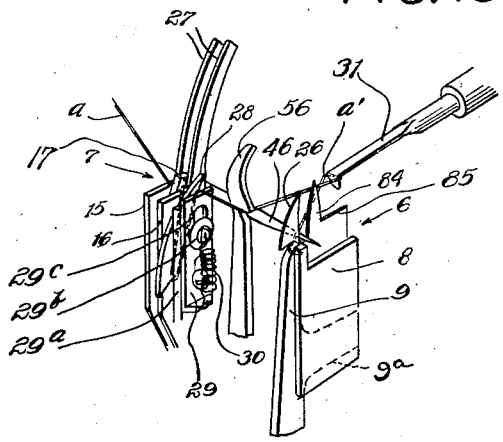

Jan. 24, 1928. 1,657,407
B. A. PETERSON
METHOD OF AND MEANS FOR TYING WEAVERS' KNOTS
Filed Oct. 1, 1923 13 Sheets-Sheet 10
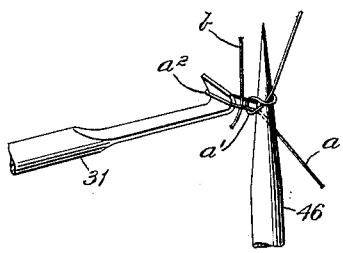
FIG. 19<sup>b</sup>
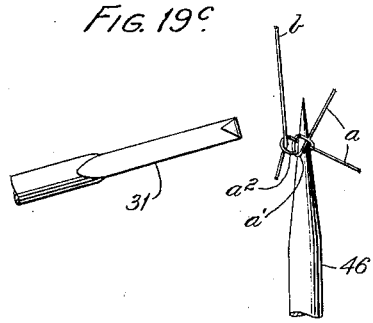
FIG. 19<sup>c</sup>
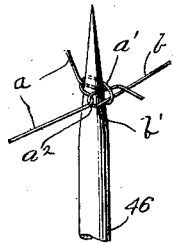
FIG. 20
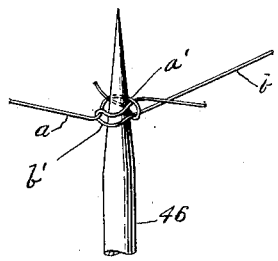
FIG. 20<sup>a</sup>
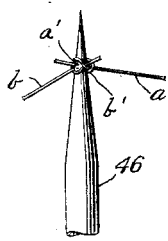
FIG. 20<sup>b</sup>
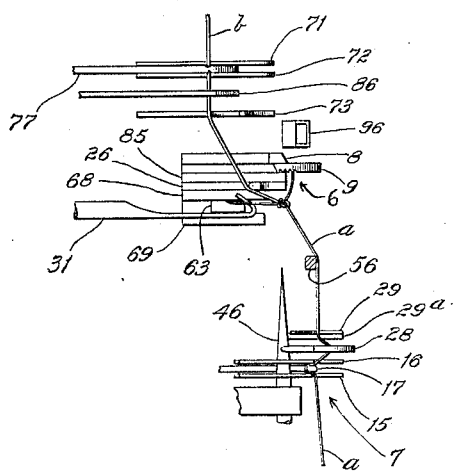
FIG. 20<sup>c</sup>
Inventor:
B. A. Peterson
By Chindall, Parker & Carlson
Attys.

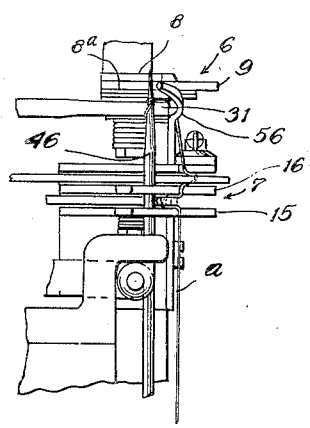

Jan. 24, 1928.
B. A. PETERSON
1,657,407
METHOD OF AND MEANS FOR TYING WEAVERS' KNOTS
Filed Oct. 1, 1923 13 Sheets-Sheet 12
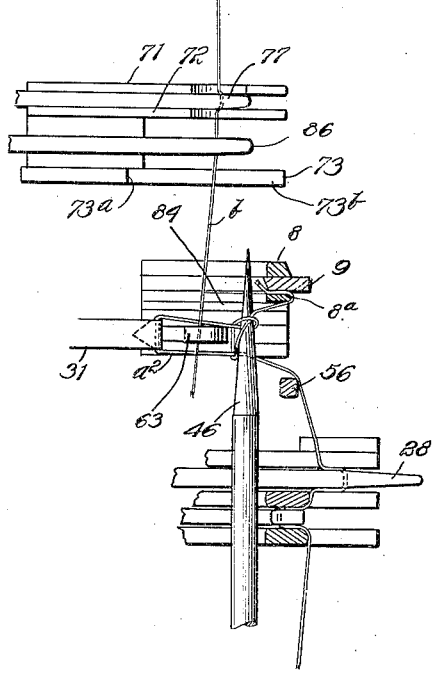
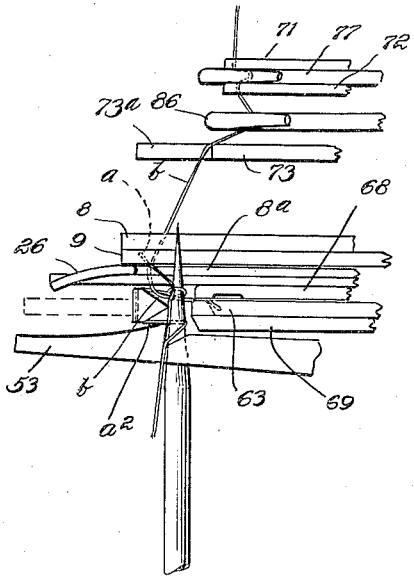
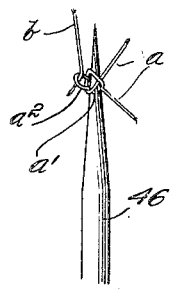
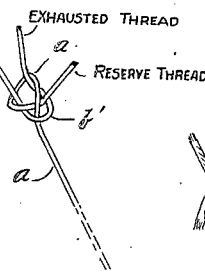
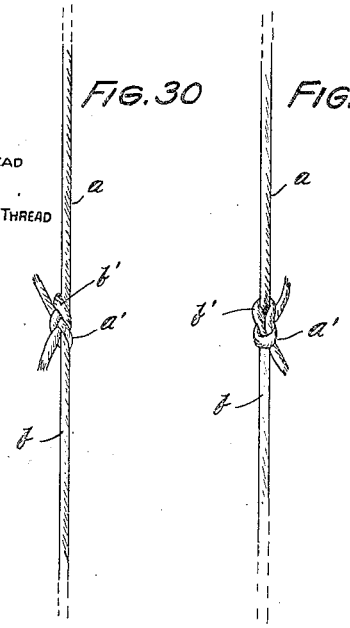
Inventor
B.A. Peterson

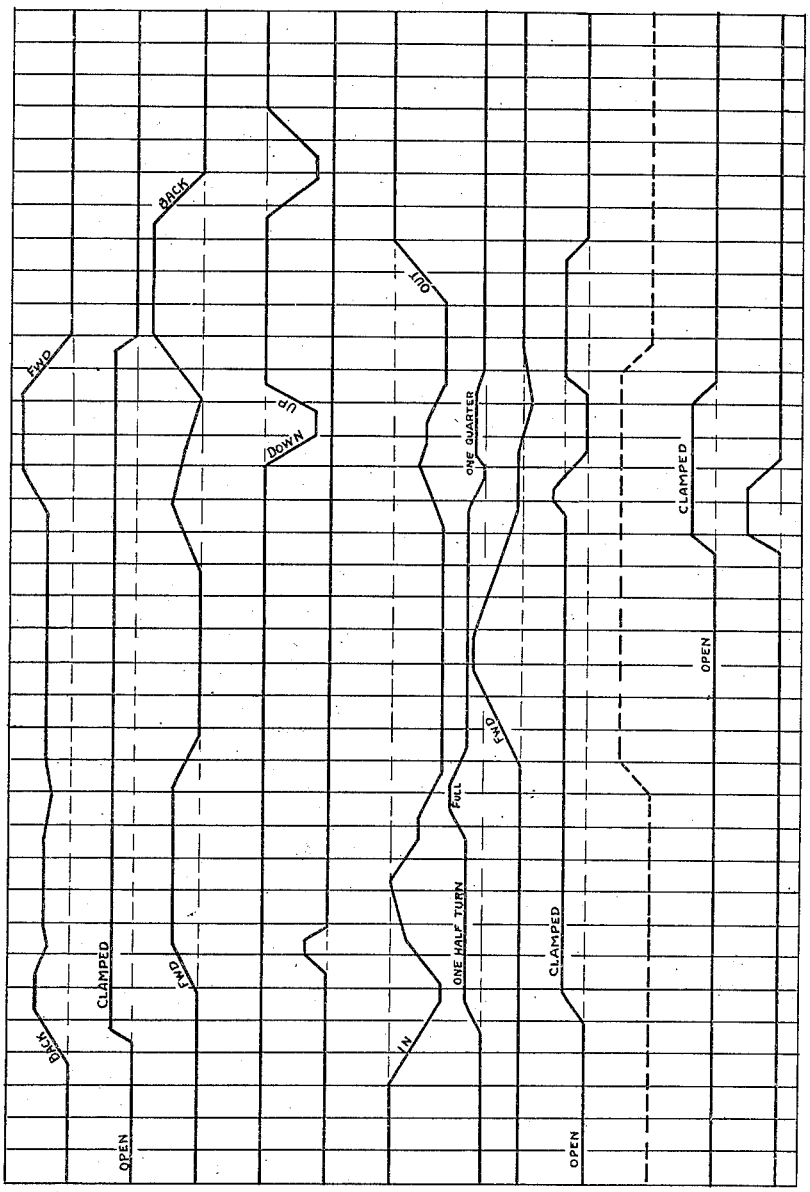

Patented Jan. 24, 1928.

1,657,407

UNITED STATES PATENT OFFICE.

BURT A. PETERSON, OF ROCKFORD, ILLINOIS, ASSIGNOR TO BARBER-COLMAN COMPANY, OF ROCKFORD, ILLINOIS, A CORPORATION OF ILLINOIS.

METHOD OF AND MEANS FOR TYING WEAVERS' KNOTS.

Application filed October 1, 1923. Serial No. 665,809.

The invention pertains to the textile art, and has for its general aim the provision of an improved method of and means for tying weavers' knots.

Because of the superiority of weavers' knots, long recognized in the textile art, many attempts have been made in the past to tie such knots by mechanically operated means and while in some instances the mechanisms or devices produced have been capable of tying the desired knot or a simulation thereof, in no case so far as I am aware has a knotter mechanism been constructed which would operate with a sufficiently high degree of accuracy and precision to be capable of practical use. The primary object of my invention is to provide a knotter mechanism operating in a novel manner to unite two thread ends with rapidity and certainty.

In the present embodiment of the invention, I have shown a knot-tying mechanism forming part of a tender mechanism which is mounted upon a winder and which serves to unite the ends of the threads of the yarn masses or cheeses being formed to the ends of the threads of reserve bobbins suitably supported upon the winder. A winder of the type to which my invention is applicable is illustrated and described in Patent No. 1,267,977 to Howard D. Colman. In this patent a winder-tending mechanism is mounted for movement around the winder and carries a knot-tying mechanism operable in the travel of the tending mechanism to unite the exhausted and reserve threads at the proper time, the reserve threads being suitably supported for engagement by the tying mechanism in its travel, and the exhausted threads of the cheeses being drawn into operative association with the knot-tying mechanism by an arm which is commonly referred to as a "down-take arm."

While the present embodiment of the invention is a mechanism applicable to winders, it is to be understood that the invention is not thus limited, for obviously various other knotters may be constructed within the scope of the invention.

In forming weavers' knots according to my invention, a loop is first formed in the reserve thread and one of the strands of the loop is crossed over the other. This loop, with its strands crossed, constitutes one of the main loops of the knot to be formed. A temporary loop is then formed out of the crossed strand of the first loop and this temporary loop is drawn through the first loop so as to form a single bow-knot of which the bow is the temporary loop. Through this temporary loop the exhausted thread end is now inserted, and the temporary loop together with the inserted thread is drawn out of the first loop, forming a loop in the exhausted thread which upon a straightening-out of the temporary loop in the crossed strand of the reserve thread, encircles said strand. The loop last formed constitutes the second one of the two coacting interengaging loops comprising the weavers' knot.

In carrying out the method above generally set forth, I preferably employ a hook member, hereinafter termed the "reserve thread hook," having a combined reciprocatory and rotatory movement. Initially this hook moves into engagement with the reserve thread held between a pair of thread clamps, and forms a bight or loop therein constituting the first or main loop of the knot to be formed, while thus forming the main loop, the reserve thread hook is rotated through approximately 180 degrees to cross one strand of the main loop over the other. An elongated member hereinafter termed the knotter post, which is mounted for longitudinal and also lateral movement, now moves laterally to one side whereby to double the strands of the main loop partially around it. The reserve thread hook simultaneously moves longitudinally through the main loop into engagement with the crossed strand upon the opposite side of the knotter post, rotates through another 180 degrees so as to twist the crossed strand about the hook end, and then moves back through the main loop carrying with it a bight of the crossed strand thus forming the temporary loop. Preferably the hook is now reversely rotated through 180 degrees in order to untwist the strands of the temporary loop caused by the said twisting operation.

Thereupon, the exhausted thread, having been moved by the "down-take" arm into a position substantially parallel with the initial position of the reserve thread, and engaged by a thread clamp, is now seized by a second hook, hereinafter termed the "exhausted thread hook," which hook has moved through the temporary loop and now returns drawing with it the end of the exhausted thread so as to insert it through the temporary loop. Further reverse rotation combined with a forward longitudinal movement, is now imparted to the reserve thread hook while the knotter post is moved laterally, whereby to effect the disengagement of the temporary loop from this hook. Tension is now placed upon the reserve thread by a movable member, hereinafter termed the "reserve thread take-up arm," so as to draw the temporary loop with a bight of the inserted exhausted thread through the main loop to form the second permanent interengaging loop. Finally, the knotter post is moved longitudinally so as to be withdrawn from the interengaging loops, and proper tension placed upon the threads to draw the knot taut.

In the accompanying drawings:

Fig. 1 is a fragmentary front end elevation of the winder tending mechanism mounted upon the frame of a winder and having mounted thereon a knotter mechanism constructed in accordance with my invention.

Fig. 2 is an elevational view of the outer side of the knotter mechanism. Parts moving toward this side are hereinafter referred to as moving "outwardly."

Fig. 3 is a similar view of the inner or winder side of this mechanism. Parts moving toward this side are hereinafter referred to as moving "inwardly."

Fig. 4 is a vertical sectional view through the knotter mechanism taken substantially in the place of line 4—4 of Fig. 2, the "inner" end being at the right.

Figs. 5 and 6 are horizontal sections taken respectively approximately in the planes of lines 5—5 and 6—6 of Fig. 4.

Figs. 7 and 8 are fragmentary detail views of the upper reserve thread and exhausted thread clamps, looking in directions at right angles to each other.

Fig. 9 is a fragmentary vertical sectional view illustrating the manner of mounting the upper reserve thread clamp and the exhausted thread hook and shear.

Fig. 10 is a vertical sectional view of a portion of the knotter mechanism taken substantially in the same plane as Fig. 4 but showing the parts in a different operative position.

Figs. 11 and 12 are fragmentary horizontal sectional views illustrating respectively the upper reserve thread clamp and shear and the lower reserve thread clamp and slack take-up arm.

Fig. 13 is a perspective view partially diagrammatic in character, showing the parts in the position which they occupy after the reserve thread hook has formed the first or main loop and crossed strands thereof.

Figure 14:
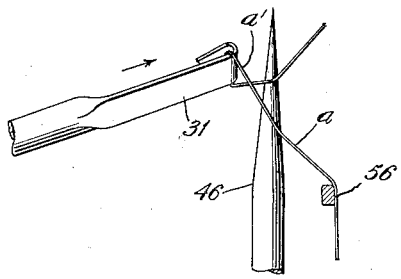

Figs. 14 to 20ᵇ are perspective views partially diagrammatic in character, and Fig. 20ᶜ an elevational view, illustrating the operation of tying the knot, as follows:

Fig. 14 illustrates the knotter post after it has moved forwardly from the position shown in Fig. 13 in the first step of the operation of forming the temporary loop.

Figure 15:
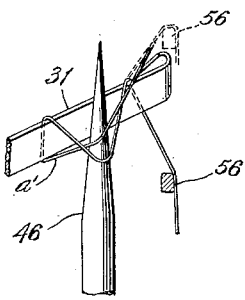

Fig. 15 illustrates the reserve thread hook about to move outwardly with respect to the winder tender mechanism into engagement with the crossed over strand, the latter having first been raised (broken lines) to permit the hook to pass beneath it and then lowered to bend it around the shank of the hook, as shown in this figure.

Figure 16:
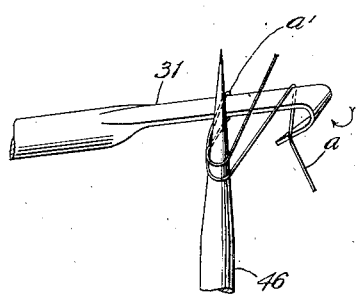

Fig. 16 shows the hook after having engaged the crossed over strand and rotated through a one-quarter revolution in the operation of twisting the strand about the hook end.

Figures 17, 18:
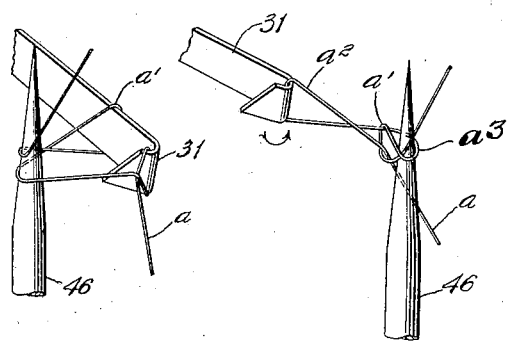

Fig. 17 shows the strand twisted about the hook end and about to be drawn through the main loop.

Fig. 18 illustrates the formation of the temporary loop drawn through the main loop with the stands of the temporary loop still crossed by reason of the aforesaid twisting operation.

Figure 19:
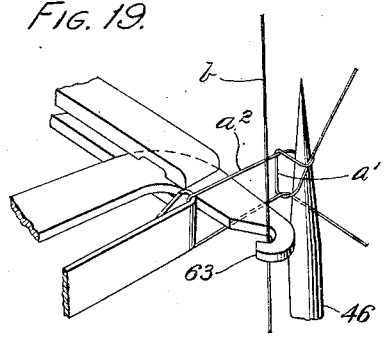
Figure 19A:
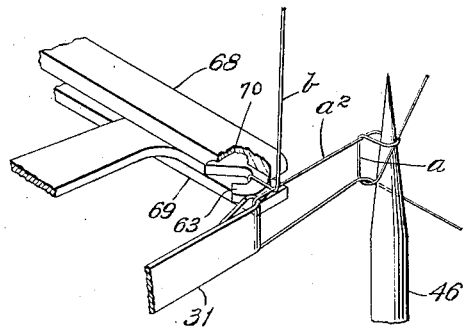

Fig. 19 shows the hook reversely rotated through a half revolution, uncrossing the strands, and also illustrates the exhausted thread hook passed through the temporary loop and engaging the exhausted thread to draw it through the temporary loop.

Fig. 19ᵃ shows the exhausted thread drawn through the temporary loop and held by its clamp.

Figs. 19ᵇ and 19ᶜ illustrate the disengagement of the temporary loop from the reserve thread hook.

Figs. 20, 20ᵃ and 20ᵇ illustrate the operation of drawing a bight of the exhausted thread through the main loop to form the second permanent loop, these views being taken from the side of the knotter post opposite that shown in Figs. 19ᵇ and 19ᶜ.

Fig. 20ᶜ shows the operation of tightening the knot.

Figs. 21 to 27 illustrate more in detail the relative positions of the parts in certain of the foregoing operations, as follows:

Fig. 21 is a fragmentary front elevational view illustrating the parts in the position of engaging the crossed strands preparatory to forming the temporary loop.

Fig. 22 is a fragmentary front elevational view of the knotter post and reserve thread hook together with a member for positioning the crossed over strand for engagement by the hook to form the temporary loop.

Fig. 23 is a view of the parts in the same positions but looking from the inner side of the knotter mechanism, as in Fig. 3.

Figs. 24 and 25 are fragmentary views illustrating the operation of twisting the crossed strands of the reserve thread around the hook for purposes of drawing it through the main loop to form the temporary loop.

Fig. 26 is a fragmentary vertical sectional view showing the parts after having formed the temporary loop and illustrating the exhausted thread engaged by its hook just prior to inserting the exhausted thread into the secondary loop.

Fig. 27 is a fragmentary elevational view illustrating the parts in the position shown in Fig. 21 but looking in a direction at right angles thereto from the inner side of the knotter mechanism.

Fig. 28 is a fragmentary elevational view of the knot partially completed showing the exhausted thread inserted through the temporary loop and ready to be drawn through the main loop which still is positioned on the knotter post.

Fig. 29 is an elevational view of the knot formed by straightening out the temporary loop and forming the second permanent loop passing through the main loop and encircling the crossed over strand thereof.

Figs. 30 and 31 are elevational views of opposite sides of the completed knot.

Fig. 32 is a time table illustrating the sequence of operation of the various mechanisms by the controlling cam.

Referring first to Fig. 1 of the drawings, A designates the frame of a winder having a track A′ upon which a winder tender mechanism C is mounted for travel. D indicates one of a series of yarn masses or cheeses mounted upon the winder through the medium of arms such as E. Spaced some distance below the cheeses D and suitably supported upon the winder framework is a series of holders (not shown) for bobbins containing threads which are to be wound upon the cheeses. These threads are termed the "reserve threads" and one such thread is indicated in Fig. 1 at a. As set forth in the said Patent to Colman, No. 1,267,977, winder tender mechanism includes a down-take arm indicated at F which operates to carry the loose end of the thread from the yarn mass or cheese D downwardly into the path of movement of the knotter mechanism, indicated generally by the character G, also mounted upon the winder tender mechanism. This loose thread from the yarn mass is termed the "exhausted thread", being indicated at b (Fig. 1).

The knotter mechanism G is enclosed, in the present embodiment, within a frame 1 (Figs. 2 and 3) of substantially rectangular form and made in two halves or sections suitably bolted together. The drive shaft for the knotter mechanism extends vertically through the frame, substantially centrally thereof, as indicated at 2 (Figs. 3 and 5), suitable bearings 3 and 4 being provided for this shaft in the upper and lower sections of the frame. Fast upon this shaft within the frame 1 is an operating cam 5 with which the various mechanisms of the knotter are associated so as to operate in properly timed relation. It will be apparent from Fig. 1 that the knotter mechanism G moves with the winder tender in a horizontal plane, and in such movement it is arranged to engage with the reserve thread a and with the exhausted thread b. The knotter mechanism comprises suitable clamps for engaging and holding the vertically disposed reserve thread a at spaced points therein and also for clamping the exhausted thread b, for purposes of the knot tying operation.

Referring now to Figs. 4 and 10, the present embodiment of the knotter mechanism comprises an upper clamp and shear for the reserve thread, indicated generally by the numeral 6, and a lower clamp indicated generally by the numeral 7. The upper one of these devices comprises a pair of stationary plates 8 and 8$^a$ and a movable shear blade 9 (Fig. 11) supported in a manner hereinafter described. The plate 8 and blade 9 are provided with coacting cutting edges, and the arrangement is such that after the thread end is severed the thread remains clamped between the plate 8$^a$ and the blade until subsequently released. Preferably the blade 9 is serrated adjacent its cutting edge as best shown in Fig. 20$^c$ to assist in clamping the thread. Said blade 9 is carried upon the forward end of an arm 10 pivoted between its ends at 11 (Figs. 3 and 5) and carrying at its rear end a roller 12 engaging in a peripheral groove 13 in the cam, the bottom of which is shaped to accomplish the reciprocation of the blade 9 at the proper times to shear and clamp and to release the thread. A spring 14 tends at all times to hold the roller 12 against the bottom of its groove 13. For guiding the blade in its movements, I provide an outwardly projecting tongue 9$^a$ thereon spaced a short distance rearwardly from the free end of the blade and sliding between the plates 8 and 8$^a$ (Figs. 8 and 11).

The lower clamp 7 (Figs. 10 and 13) consists of a pair of plates 15 and 16 between which operates a clamping finger 17 to clamp and hold the thread. This finger 17 is arranged to be actuated in the movement of a lever 18 pivoted between its ends at 19 (Figs. 4 and 6) and having a roller 20 at its outer end operating in a groove 21 in the under face of the cam 5. Said lever 18 carries near its forward end a pin 22 which is adapted to engage cam surfaces 23, 23$^a$ and 25, 25ª rigid with the finger 17 and provided in the present instance by means of a plate 24 pivoted at 24ª and having its central portion cut away in such a way as to form such cam surfaces. As the lever 18 moves rearwardly the pin engages the cam surfaces 23 and 23ª to move the finger 17 in an outward direction into engagement with the plates 15 and 16; and, as the lever moves forwardly, the pin engages the cam surfaces 25, 25ª to effect the return of the finger to its initial or open position. The arm 18 while thus serving to operate the clamping finger 17, has for an additional function the support of a slack take-up device for the reserve thread, to be presently described.

For guiding the reserve thread a into the clamps 6 and 7, I preferably provide adjacent to the upper clamp a guide member 26 (Figs. 5 and 13) formed integral with the plate 8ª at the inner end thereof, and rigid with the plates 15 and 16 of the lower clamp a pair of inwardly inclined curved guide members 27. These guides 27 are formed near the outer edges of the plates 15 and 16 so that they serve to position the thread upon the forward edges of said plates in position to be engaged by the finger 17 operating between the plates.

It will be understood that the clamping devices 6 and 7 operate in timed relation whereby properly to hold and release the thread. Just prior to the time that the lower clamp 7 operates to grip and hold the thread, slack is provided in the thread sufficient for the subsequent knot-forming operation, by means of a slack take-up member 28 (Figs. 6 and 13), which is in the form of a hook and is carried by the outer end of the lever 18 which operates the clamping finger 17. This member 28 operates between the plate 16 of the lower clamp 7 and a plate 29 mounted in spaced relation thereto upon a stationary support 29ª and yieldingly held by a spring 30 in a normal position with its forward edge substantially flush with the forward edge of the plate 16. The spring 30 is anchored at one end to the plate 29 and at its other end to a screw 29ᵇ entered through a slot 29ᶜ in the plate and into the support 29ª. The shape of the groove 21 is such that immediately prior to the gripping of the thread by the clamp 7, the slack take-up hook 28 engages the thread and moving rearwardly between the plates 16 and 29 forms a loop therein, as shown in Fig. 13, to provide the necessary slack in the thread for the knot-tying operation. The plate 29 by reason of the yielding character of its mounting is capable of compensating for any slight excess slack which may be desired in said knot tying operation, thus avoiding any breakage of the thread.

Referring now to Figs. 4 and 5, the reserve thread is now ready to be engaged by the reserve thread hook to form the main loop therein in the initial stage of the knot-forming operation. This hook is indicated by the numeral 31 and is mounted upon the inner end of a shaft 32 rotatably and slidably supported in suitable bearings 33 and 34 near the forward side of the frame for the combined reciprocatory and rotary movements which are imparted thereto in the operation of tying the knot. The means for reciprocating the hook comprises a lever 35 pivoted at its rear end as at 36 and having between its ends a roller 37 (Fig. 2) engaging in a groove 38 (Fig. 5) in the upper face of the cam 5. The forward end of this lever operatively engages between a pair of collars 39 fast upon the shaft 32 so as to permit of the rotary movements of the shaft.

Rotation of the shaft is effected in the present instance by means of a toothed segment 40 (Fig. 2) meshing with an elongated pinion 41 rigid with the shaft 32. Said segment is carried by the forward end of a lever 42 pivoted at its rear end as at 43 and having between its ends a roller 44 (Fig. 5) engaging in a peripheral groove 45 in the cam 5. As indicated in Fig. 4, this groove 45 is arranged to effect the up and down movements of the segment 40, and the arrangement is such that the shaft 41 and hence the hook 31 may be rotated through one complete revolution and back to its initial position for a purpose which will presently be apparent.

Initially the hook 31 projects inwardly toward the winder tender mechanism, occupying a position (Fig. 4) such that the reserve thread when engaged by the clamps 6 and 7, is disposed directly in the path of movement of the hook. Immediately after the movement of the thread into the clamps, the hook is moved outwardly relative to the winder tender mechanism, causing the thread to move with it. Thus the main loop a' (Fig. 10) is formed. In such initial outward movement of the hook 31, it is also caused to rotate through 180 degrees whereby to cross one of the strands over the other. In the present instance the hook, when viewed as in Figs. 3 and 13, rotates in a clockwise direction, so that the portion of the thread held by the lower clamp constitutes the crossed strand.

Following the outward movement of the hook 31 to form the main loop a', the knotter post 46, which constitutes a pivotal point around which the knot is tied, is moved laterally from a position in a plane rearwardly of the hook to a position in a plane forwardly thereof (compare Figs. 13 and 14). This post is carried in a vertically disposed position by the inner end of a bell crank lever 47 pivoted between its ends at 47ª (Fig. 6) and carrying at the end of a rearwardly extending portion a roller 48 operating in a groove 49 in the under face of the cam 5. The inner end of the lever 47 (Fig. 4) is in the form of a yoke in which the post 46 is mounted for up and down movement. Said post may be of any suitable construction, being herein formed from a wire of relatively heavy gauge, and preferably it tapers gradually to a point at its upper end. Between its ends the wire is bent to form an eye 50 to receive a pin 51 carried upon the forward end of a lever 52 (Figs. 3 and 4) the rear end of which is pivotally mounted at 53 and which is arranged to be moved up and down by a roller 54 (Fig. 4) operating in a cam groove 55 in the periphery of the cam 5.

As above indicated, after the outward movement of the hook 31 is completed, a lateral forward movement is imparted to the post 46 which serves to bend the two strands of the main loop $a'$ partially around the post, as shown clearly in Figs. 14 and 23. At the same time the hook, now facing rearwardly, moves inwardly past the rear side of the post into position to engage the crossed-over strand of the main loop to draw a bight thereof around the post and outwardly to form the secondary loop. The portion of the strand which is thus drawn around the anchoring post constitutes an anchoring loop $a^3$ for the thread $a$. To enable the hook thus to engage the crossed over strand, I provide in the present instance a three-positioning device comprising a forwardly projecting finger 56 carried by the rear end of an arm 57 (Fig. 3) which extends first rearwardly and then downwardly for pivotal support between its ends at 58. The extreme rear end of the arm carries a roller 59 engaging with a cam surface 60 upon the under side of the cam 5, and the roller 59 is normally held to the cam surface 60 by a coiled contractile spring 61 which is anchored to a post 62 suitably mounted in the frame.

The arrangement is such in the present instance that as the hook 31 moves slowly inwardly, the finger 56 moves upwardly quite rapidly to carry the crossed strand above the hook (broken lines Fig. 15). The latter now moves outwardly into engagement with the crossed strand, and then it is given also a rotary movement through an additional 180 degrees to the position shown in Figs. 16, 17 and 24. Such additional rotary movement serves to twist the strand about the end of the hook, as clearly indicated in Fig. 17, so that in the continued outward movement of the hook the crossed strand is drawn through the main loop $a'$, which now encircles the shank of the hook 31, to form the temporary loop $a^2$ (Fig. 18). During such outward movement of the hook to form the temporary loop $a^2$, the hook is reversely rotated through 180 degrees to untwist the strands of the temporary loop caused by the twisting operation above mentioned, so as properly to position the temporary loop for the insertion of the exhausted thread $b$ through the temporary loop (Figs. 19 and 26).

At this point in the operation of the mechanism the down-take arm F (Fig. 1) operates to carry the end of the exhausted thread $b$ into the knotter mechanism and the means for inserting the thread through the temporary loop. This means comprises a hook 63 (Figs. 5, 9 and 11) extending forwardly from the inner end of one arm of a bell crank lever 64 pivoted at 65 and carrying at the free end of its other arm a roller 66 operating in a cam groove 67 in the upper face of the cam 5. Said groove is shaped so as to effect the reciprocation of the hook in a front to rear direction, and the hook is arranged to slide between a pair of plates 68 and 69 (Figs. 3, 8 and 9) conveniently supported in the frame near the upper inner portion thereof in a manner to be presently described. The plate 69 is provided at its forward end with a sharpened or cutting edge $69^a$ shown clearly in Fig. 9, adapted to coact with a cutting edge $63^a$ upon the hook, whereby in the operation of clamping the exhausted thread it is at the same time severed. The forward edge of the plate 68 on the other hand, as well as the edge of the hook on the side opposite the edge $63^a$, are rounded so that while the thread is severed between the hook and the plate 69 it is merely clamped by the plate 68 and the hook.

When the exhausted thread has thus been inserted into the temporary loop $a^2$ of the reserve thread, tension is placed upon the reserve thread held by the lower clamp 7, to withdraw the temporary loop through the main loop $a'$ carrying with it a bight of the exhausted thread (Fig. 28) and forming in the latter the second permanent loop $b'$. In this operation the exhausted thread is released from its hook and clamping plate 68 by imparting an additional rearward movement to the hook to carry the end portion of the hook opposite a recess 70 formed in the face of the plate 68. As the thread clamped between the hook and the plate moves into this recess, it obviously becomes released.

Preferably means is provided for guiding the exhausted thread with respect to the parts of the knotter mechanism which are to operate thereon, and means is also provided for clamping (but not shearing) the exhausted thread when it has thus been positioned. The clamping means comprises a pair of spaced plates 71 and 72 (Figs. 7, 8 and 10) supported in vertically spaced relation above a third plate 73. All of said plates, with suitable spacer blocks, are rigidly secured upon the under side of a downward extension 74 of the top member of the frame 1 by means of a screw 75 and dowel pins 75ª; and the plates extend forwardly and inwardly (Fig. 5) from the frame extension 74. The plates 71 and 72 are secured together for relative yielding movement by means of a headed stud 76 secured to the plate 72 and carrying an expansion spring 76ª bearing between the head of the stud and the plate 71. The plate 73 has a portion extending inwardly near its forward end. Thus there is provided a forwardly facing shoulder 73ᵇ adapted to be engaged by the exhausted thread while the extreme forward end of the plate provides a shoulder 73ª adapted to guide the thread against outward movement.

Between said plates 71 and 72 operates a clamping finger 77 carried upon the inner end of a bell crank lever 78 (Fig. 5) pivoted at 79 and carrying at the free end of its other arm a roller 80 held in operative engagement with the periphery of the cam 5 by a spring 81 (Fig. 5). Said peripheral surface of the cam is provided with a groove 82 which is adapted to effect the movement of the finger 77 at the proper time to clamp the exhausted thread during the operation of inserting the end thereof through the temporary loop $a^2$ and forming the second permanent loop $b'$, as above described. Preferably the plates 71 and 72 are provided with notches 83 therein (Fig. 5) adapted to coact with the hooked end of the finger 77 whereby to clamp the exhausted thread in proper position.

For further guiding the exhausted thread for engagement by the hook 63, I employ a guide member providing a projection 84 and a shoulder 85. This guide member is positioned adjacent the clamping member 26 of the upper reserve thread clamp 6, with its outer edge spaced laterally a short distance inwardly from the shoulder 73ª (Fig. 10). Also the projection is spaced outwardly from the member 26, as shown in Figs. 5 and 10, so as to form between it and the member 26 a path of movement for the knotter post 46. As shown in Fig. 10 this guide member 84 is located immediately above the exhausted thread hook 63; and the guide member 26 is preferably bent downwardly from its support on the plate 8ª into substantial alinement with the member 84 (Fig. 7).

For providing slack in the exhausted thread sufficient to enable the formation of the second permanent loop $b'$, a slack-take-up device is provided comprising a finger 86 (Figs. 10 and 27) shaped like the clamping finger 77 (Fig. 5) and disposed between the plate 72 and the plate 73 which is mounted beneath the plate 72 in spaced relation thereto. The finger 86 is carried by a bell crank lever 87 (Fig. 4) mounted upon the pivot post 79 which carries the lever 78. This lever 87 carries a roller 88 located directly beneath the roller 80, which is held by a contractile spring 89 anchored to the plate 73 (Fig. 5), in engagement with the outer periphery of the cam 5. The latter is provided with a cam groove 90 (Fig. 5) to effect the reciprocation of the finger 86. Said groove is shaped so that as the finger 77 operates to clamp the thread, the finger 86 operates to provide the desired slack therein.

Referring now to Figs. 7 to 10, the construction provided in the present instance for supporting the stationary parts of the upper reserve thread clamp, the clamp and shear for the exhausted thread, and the guides 26 and 84 for both threads will now be described. From the depending portion 74 of the frame 1, I provide a downward extension 91, (Figs. 7 and 8), upon the under side of which is rigidly secured the plate 8 (Fig. 9) of the upper reserve thread clamp. Below this plate and in spaced relation thereto is mounted the plate 8ª carrying the guide member 26, the space between said plates being occupied by the guide tongue 9ª on the blade 9. Below the guide member 26 is a plate 84ª carrying the guide member 84 for the exhausted thread, and the plates 68 and 69 for the exhausted thread hook clamp are mounted in spaced relation below the plate 84ª so as to receive between them the hook 63. All of the plates thus referred to are secured upon the underside of the plate 8 by means of a stud 92 rigid with said plate 8 and carrying a head 93 between which and the plate 69 is coiled about the stud an expansion spring 94. Relative rotation between the plates is prevented by suitable dowel pins 95.

Referring to Fig. 32, I have shown a time table illustrating the movements effected by the cam 5. The various cam surfaces are laid out in such a manner as to illustrate the relative movements which are imparted to the various parts of the knotter mechanism but indicating only the beginning and ending of each movement without attempting to represent accurately the rate of movement between such points. Briefly, the parts move in substantially the following order to accomplish the knot-tying operation:

Assuming the parts to be in their initial position (Fig. 4) with the reserve thread hook in its innermost position, the thread clamps open, and the knotter post 46 in its uppermost position and rearwardly of the hook 31; said hook is actuated by the lever 35 (Fig. 4) and cam roller 37 (Fig. 2) so as to move outwardly into engagement with the reserve thread with which the upper and lower reserve thread clamps 6 and 7 have engaged in the travel of the winder tender mechanism. During this movement of the hook 31 the reserve thread slack-take-up member 28 is actuated by the lever 18 and cam roller 20 (Fig. 6) so as to move rearwardly to provide the desired slack in the reserve thread; and at about the same time the lower reserve thread clamping finger 17 is moved by the pin 22 on the lever 18, engaging the cam surfaces 23 and 23ª, whereby to grip and hold the thread. As the member 28 finishes its said movement, the member 9 of the upper reserve thread clamp and shear device 6 is operated by the lever 10 (Fig. 5) to clamp the reserve thread near its upper end and sever the free end which passes into a suction tube 96 (Fig. 4) communicating with a suitable vacuum pump (not shown). The said rearward movement of the hook 31 serves to form the main loop $a'$ in the reserve thread; and near the end of such movement the hook is caused to rotate through 180 degrees by the operation of the lever 42, segment 40 (Fig. 2) and pinion 41 on the shaft 32, whereby to cross one strand of the loop over the other (Fig. 13).

At the end of the inward movement of the hook 31 and after its rotation through a half revolution, the knotter post 46 is moved forwardly (Fig. 14) by the operation of the lever 47 and its roller 48 operating in the cam groove 49 (Fig. 6). At the same time, inward movement is imparted to the reserve thread hook by its lever 35, roller 37 and cam groove 38. In this movement, the main loop $a'$ slides over the shank of the hook 31 partially encircling it, as shown in Fig. 15; and the member 56 acts to position the crossed strand of the thread through the operation of the lever 57 (Fig. 3) and its roller 59 engaging the cam surface 60 on the underside of the cam groove. The arrangement is such that in the inward movement of the hook the member 56 raises the crossed strand so that the hook passes thereunder, and then before the hook moves outwardly lowers the strand, causing it to bend downwardly directly in the path of movement of the hook (Fig. 15). Accordingly as the hook now moves outwardly, the crossed strand is engaged by the hook and is drawn around the post 46 to form the anchoring loop $a^3$. When the hook has moved outwardly about half way, it is caused to rotate through another 180 degrees, twisting the crossed over strand about its end as shown in Fig. 17. The hook now points forwardly as initially, and in this position it completes its outward movement, carrying the twisted strand through the loop $a'$ and thus forming the temporary loop $a^2$ (Fig. 18). In this operation of thus forming the main loop $a'$ and the temporary loop $a^2$ the movements of the knotter post and the thread hook are coordinated so that the thread is maintained under the proper tension without the aid of the take-up member 28, except that it acts to let out a small amount of slack during the latter portion of this operation.

As the hook 31 completes its said outward movement, the knotter post 46 is moved rearwardly to its initial position; and at the end of such outward movement of the hook it is caused to rotate reversely through a half revolution (Fig. 19) so as to untwist the crossed over strand of the reserve thread and to position the temporary loop $a^2$ for the operation of inserting therethrough the exhausted thread which is now carried into the knotter mechanism by the downtake arm F of the winder tender mechanism.

In this operation the exhausted thread hook 63 first moves forwardly through the operation of the lever 64, roller 66 and cam groove 67 (Fig. 5) and, passing through the temporary loop $a^2$, seizes the exhausted thread which has been positioned by the operation of the down-take arm F of the winder tender mechanism. Said hook 63, moving rearwardly carries the exhausted thread into engagement with the plates 68 and 69, severing the free end thereof but continuing to hold the thread. At substantially the same time, the slack take-up device 86 operates to provide slack in the exhausted thread for the formation of the second permanent loop $b'$, and the finger 77 of the upper exhausted thread clamp operates to grip the thread. Such movements of the slack take-up device 86 and finger 77 are effected through the operation of the levers 78 (Fig. 5) and 87 (Fig. 10) by their respective rollers 80 and 88 operating in the cam grooves 82 and 90.

The next operation is that of drawing the two main loops $a'$ and $b'$ into opposed relation, releasing the loop $a^2$ from the hook 31 and withdrawing the knotter post 46 while tightening the knot. In this operation, the knotter post 46 is moved forwardly (Fig. 19ᵇ) and the hook 31 is simultaneously moved inwardly past the rear side of the post and rotated through a quarter revolution toward its initial position. This rotatory and inward movement of the hook 31, combined with the forward movement of the knotter post effects the release of the loop $a^2$ (Fig. 19ᶜ). As the hook member then moves outwardly, tension is placed upon the reserve thread by the operation of the member 28, and the exhausted thread slack take-up device 86 operates to let out slack. The temporary loop $a^2$ is thus withdrawn through the main loop $a'$ (Fig. 20) as the latter is wrapped around one side of the knotter post 46, and the temporary loop $a^2$ becomes straightened out or dissolved with the result that the second permanent loop $b'$ is formed, encircling the crossed-over strand of the main loop (Figs. 20ª and 20ᵇ) and disposed on the opposite side of the knotter post. As yet the several clamps have not operated to release their respective threads so that the opposed loops *a'* and *b'* are maintained in proper relation to each other during the operation of tightening the knot.

As the knotter post is now moved downwardly to withdraw it from between the two interengaging loops *a'* and *b'* the shear blade 9 of the upper reserve thread clamp moves outwardly slightly and because the thread is held against slipping relative thereto by the serrated under surface of the blade, this movement serves to take up the slack in the reserve thread due to the gradual decreasing diameter of the post relative to the knot as the post is withdrawn. The exhausted thread continues to be held by the hook 63 and plate 68 (Fig. 20ᵉ), and the reserve thread hook is moved first inwardly and then outwardly while being simultaneously rotated reversely through a quarter turn into the position shown in Fig. 20ᵉ. The hook is thus positioned so that as it moves outwardly it engages with the exhausted thread as shown clearly in said figure, and draws it taut. The effect, it will be apparent, is that the reserve thread hook acts upon the exhausted thread to assist in tightening the knot.

The exhausted thread hook 63 is next moved to carry the thread into the recess 70 to release it. Also, the reserve thread held by the upper shear and clamp device 6 is released through the operation of the cutting blade 9, and then the exhausted thread is released by the movement of the clamping finger 77 out of engagement with the plates 71 and 72. The lower reserve thread clamp 7, however, continues to hold the reserve thread, while a forward movement is imparted to the knotter post to move the united threads out of their respective guides.

Near the end of such forward movement of the knotter post, the reserve thread clamp 7 is opened and the reserve thread hook 31 is rotated through a final quarter revolution to its initial position. Similarly the other parts are restored to their initial positions, the knotter post moving down and up while moving into position rearwardly of the reserve thread hook which has just previously been moved into its initial position.

The mechanism which I have provided operates with certainty to unite two threads ends in a most efficient manner. The engagement of the threads by the knotter mechanism is wholly automatic with the exception of the placing of the reserve thread which is done by the operative attending the machine. Thus I have rendered it possible not only to accomplish the tying of knots with great rapidity but in the most preferred manner with a high degree of efficiency.

While the construction and arrangement of the parts herein shown and described is preferred, it is contemplated that various changes may be made by those skilled in the art without departing from the spirit and scope of the invention as expressed in the appended claims.

I claim as my invention:

1. A means for tying weavers' knots comprising, in combination, means operable to form a loop in a thread with one strand crossed over the other, said means including a reciprocatory hook, and means for positioning the crossed over strand for engagement by said hook whereby to form a loop in said strand.

2. A means for tying weavers' knots comprising, in combination, means operable to form a loop in a thread with one strand crossed over the other, said means including a reciprocatory hook, and means for positioning the cross over strand for engagement by said hook whereby to form a loop in said strand, the last mentioned means comprising a finger mounted for up and down swinging movement on an axis parallel to said hook.

3. A means for tying weavers' knots having a hook adapted to engage with a thread to form a loop therein with one strand crossed over the other, said hook also being operable to form a second loop in the crossed over strand of the first loop, an anchoring element with which said strand is adapted to engage, and means for positioning said strand for engagement by said hook comprising a finger movable relative to said element and operable to bend the strand around the shank of the hook.

4. A means for tying weavers' knots having a reciprocatory member having a hooked end, and means operable to carry a thread and bend it partially around said member in position to be engaged by the hooked end thereof in the reciprocation of said member.

5. A mechanism for tying weavers' knots having means for forming a loop in a thread comprising a hook member, a shaft carrying said hook member, means providing a support for said shaft, and means for rotating and reciprocating the shaft in said support comprising a rotary cam, a lever having a rotary, but non-slidable connection with said shaft and arranged to be operated by said cam, and a second lever swingable in the rotation of said cam and operatively connected with the shaft to impart rotary movement thereto.

6. A mechanism for tying weavers' knots having means for forming a loop in a thread comprising a hook member, a shaft carrying said hook member, means providing a support for said shaft, and means for rotating and reciprocating the shaft in said support comprising a rotary cam, a lever operable in the rotation of the cam for reciprocating the shaft, a pinion rigid with the shaft, and a second lever operatively associated with the cam and having a gear segment meshing with said pinion, said pinion being of a length such as to permit the longitudinal movements of the shaft while continuing in engagement with said segment.

7. In a weaver's knotter, a loop-forming means including a reciprocatory and rotatable hook member adapted to engage with a thread to form a loop therein having one strand crossed over the other, and means for moving said crossed over strand to carry it around the hook member into a position to be engaged thereby to form a second loop in the thread.

8. A mechanism for tying weavers' knots having a loop-forming means comprising a hook member operable to form a loop having one strand crossed over the other, a post, means for effecting relative movement between said hook member and said post whereby to double the strands of said loop around one side of the post with the crossed-over strand engaging the hook member on the opposite side of said post, said hook member being subsequently operable to form in the crossed-over strand a second loop and draw it through the first loop.

9. A mechanism for tying weavers' knots having loop-forming means comprising a hook member having a combined reciprocatory and rotatory movement adapted to operate upon a thread to form a loop therein having one strand crossed over the other, a knotter post, means for effecting relative movement between said post and said hook member whereby to double the strands of said loop partially around the post, and means to engage the crossed over strand of said loop with said hook member, said hook member being subsequently operable to draw a bight of said crossed-over strand through the first mentioned loop to form a second loop.

10. A mechanism for tying weavers' knots having a loop-forming means comprising a hook member movable rotatably and reciprocably, a knotter post, thread positioning means and means for moving the hook member, the thread positioning means and the post whereby to cause the hook member to move into engagement with a thread to form a loop therein having one strand crossed over the other, double the strands of the loop partially around the post, and finally engage with the crossed over strand of the loop twisting it about the hook member and drawing it through the first mentioned loop to form a second loop.

11. A mechanism for tying weavers' knots having a loop forming means comprising a hook member, a post, means for reciprocating the hook member and at the same time imparting rotation thereto, and means for effecting relative lateral movement between the hook member and the post.

12. A mechanism for tying weavers' knots having means for forming in a thread a loop having a crossed-over strand and then drawing a bight of the crossed over strand through the loop to form a single bow-knot, said means comprising a hook member mounted for longitudinal and rotary movements, and a post mounted for lateral movement relative to the hook member.

13. A mechanism for tying weavers' knots having means for forming a single bow-knot including a hook member, a post, and means for moving said hook member successively into engagement with a thread to form a loop therein, and into engagement with one strand of said loop to form a second loop constituting the bow of said bow-knot.

14. A mechanism for tying weavers' knots having means for forming a single bow-knot in a thread including an anchoring post and a hook member having a hooked end of substantially triangular shape, said member being movable successively into engagement with a thread to form a loop therein with one strand crossed over the other and then through said loop into engagement with the crossed over strand to draw a bight thereof through the said loop while the latter encircles said shank whereby to form a second loop, said shank and post being adapted to maintain the first loop in a substantially triangular form while the hook member moves therethrough in forming the second loop.

15. A mechanism for tying weavers' knots having means for forming a single bow-knot in a thread including a member having a relatively flat end portion forming a shank with a hooked end and a second member positioned adjacent the hook member, the hook member being movable successively into engagement with the thread to form a loop therein having one strand crossed over the other, then into engagement with the crossed over strand while said loop encircles said shank with the strands of the loop passing around said second member, and finally drawing a bight of the crossed over strand through the first mentioned loop to form a second loop.

16. A mechanism for tying weavers' knots including a hook member and a second or knot-anchoring member, said hook member being adapted successively to engage with a thread to form a main loop, and a temporary loop drawn through the main loop to form a single bow-knot, means for forming a loop in a second thread for interengagement with the first mentioned loop including means for drawing said second thread through the temporary loop, and means for drawing the temporary loop with the inserted thread through the main loop to form said inter-engaging loop.

17. A mechanism for tying weavers' knots having means for drawing the end of one thread through a loop formed in a second thread comprising a hook movable through said loop to engage the thread, and a pair of spaced members with which said hook is adapted to engage to shear and clamp the inserted thread.

18. A mechanism for tying weavers' knots having means for drawing the end of one thread through a loop formed in a second thread comprising a hook movable through said loop to engage the thread, and a pair of spaced members with which said hook is adapted to engage to shear and clamp the inserted thread, one of said pair of members coacting with said hook to form a shear and the other one of said pair of members coacting with the hook to form a clamp.

19. A knot-tying mechanism having means for shearing and clamping a thread comprising a hook member, a pair of spaced members between which said hook member is arranged to pass, said hook member and one of said pair of members constituting a shear, and the hook member and the other one of said pair of members constituting a clamp.

20. A knot-tying mechanism having means for engaging and holding a thread comprising a hook, a member with which said hook is adapted to coact, and means for effecting relative movement between said hook and member whereby to draw a thread between them to clamp it and then to move the thread to release it, one of the parts having a recess adapted to receive the thread in the releasing operation.

21. A mechanism for tying weavers' knots having means operable into engagement with a thread to form one of two interengaging loops with a temporary loop formed in one strand thereof and encircled by the main loop, and means for forming the other one of said two interengaging loops including means for inserting a second thread through said temporary loop, and means for drawing a bight of the second thread with the temporary loop through the main loop.

22. A mechanism for tying weavers' knots having means operable upon a thread to form a main loop therein and a temporary loop drawn through the main loop, said means including a post, a hook member movable into engagement with a thread at one side of said post to form the main loop and then through the main loop to engage with one strand thereof at the opposite side of said post to draw it through the main loop.

23. A mechanism for tying weavers' knots having means operable upon a thread to form a main loop therein and a temporary loop drawn through the main loop, said means comprising a post, a hook member movable into engagement with a thread at one side of said post to form the main loop and then through the main loop to engage with one strand thereof at the opposite side of said post to draw it through the main loop, and means for positioning said strand for engagement by said hook.

24. A mechanism for tying weavers' knots having a post, a member having a hooked end, means for effecting relative movement between said hook member and said post whereby to cause the hook member to engage with a thread to form a loop therein, rotate the hook member first through substantially 180 degrees to cross one strand of said loop over the other, and then cause the hook member to engage with the crossed-over strand to draw a bight thereof around said post through the main loop, and means for positioning said strand for engagement by said hook member, the latter being finally rotated by the first mentioned means through a second 180 degrees to twist the strand about the hook end.

25. A mechanism for tying weavers' knots having a reciprocatory and rotatable hook member, a knot-anchoring member, means for supporting the hook member and the anchoring member for relative lateral motion, and actuating means whereby the hook member initially engages with a thread with its hooked end directed away from the post, moves longitudinally to form a loop in the thread and simultaneously rotates through substantially a half revolution whereby to cross one strand of the thread over the other, then moves through the main loop into engagement with the crossed over strand, and finally rotates through substantially another half revolution to twist the crossed over strand about the hook end for movement with the hook through said main loop.

26. A mechanism for tying weavers' knots having a loop forming means including a hook member, a post, means for reciprocating the hook member, means for effecting relative movement between said hook member and said post to cause the hook to reciprocate first upon one side of the post and then upon the other, and means for rotating said hook during such reciprocatory movements.

27. A mechanism for tying weavers' knots having a loop-forming means including a hook member, a post, means for reciprocating the hook member, means for effecting relative movement between said hook member and said post to cause the hook to reciprocate first upon one side of the post and then upon the other, means for rotating said hook during such reciprocatory movements, and means for positioning a thread for engagement by said hook member whereby to effect a twisting of the thread around the hook end in the rotation of the latter.

28. A mechanism for tying weavers' knots having a loop-forming means including a hook member, a post, means for reciprocating the hook member, means for effecting relative movement between said hook member and said post to cause the hook to reciprocate first upon one side of the post and then upon the other, means for rotating said hook during such reciprocatory movements, and means for positioning a thread for engagement by said hook member whereby to effect a twisting of the thread around the hook end, the last named means comprising a rotary cam member, a lever operatively associated with said cam member, and a finger actuated by said lever to engage with said thread.

29. A knotter comprising, in combination, a pair of spaced clamps adapted to engage and hold a thread, one of said clamps being adapted to shear the thread, a third clamp adapted to engage and hold a second thread, knot-forming means including a fourth clamp having a hook member adapted to engage and hold the second thread, and a slack take-up device for each of said threads.

30. A knotter comprising, in combination, a rotary cam, means for engaging and holding a thread including a pair of spaced clamps each having a member operatively associated with said cam, and knot-forming means also operatively associated with said cam.

31. A knotter comprising, in combination, a rotary cam, means for engaging and holding a thread including a pair of spaced clamps each having a member operatively associated with said cam, knot-forming means operatively associated with said cam, and means for providing slack in the thread also associated with said cam.

32. A knotter comprising, in combination, an actuating cam knot-forming means, means for positioning and holding threads for engagement by said knot-forming means, and means for providing slack in said threads, all of said means being operatively associated with said cam.

33. A knot-tying mechanism comprising, in combination, means for holding a thread, means for holding a second thread, knot-forming means including a pair of relatively movable members, and means including a single cam for operating all of said means in timed relation.

34. A knotter having means for holding a thread, means for providing slack in the thread, and means for operating said two means comprising a cam and a single lever operatively associated with the cam.

35. A knotter having means for holding a thread including a stationary member and a movable member, and means for operating the movable member including a lever, and means providing a cam surface rigid with said movable member adapted for engagement by a part on said lever in the movements of the latter to actuate said movable member.

36. A knotter having a thread clamp including a movable member, a slack take-up device, a lever carrying said slack take-up device, means for operating said lever, and means providing a cam surface adapted to be engaged by a part on said lever to actuate said clamping member.

37. A knotter having a post, a lever having said post slidable therein, a second lever operatively connected with said post, and means for operating said levers to move the post laterally as well as longitudinally.

38. A means for tying weavers' knots having, in combination, a post, a hook adapted to engage with a thread, and means for effecting relative movement between said hook and post whereby to form a loop in the thread with the strands thereof drawn partially around said post and to cause the hook member to engage with one strand of said loop and draw it through the first mentioned loop to form a single bow knot.

39. A mechanism for tying weavers' knots having, in combination, a post, and means for engaging with a thread to form a single bow knot therein, said means including a reciprocatory hook member operable first into engagement with the thread to form a loop therein with the strands bent partially around said post, and then into engagement with one of the strands to draw it around the other strand and through the first mentioned loop.

40. The method of tying weavers' knots which consists in forming a loop in a thread, then forming a second loop in one strand of the main loop and drawing it around the other strand thereof and through the main loop, inserting a thread through the second loop thus formed, and withdrawing the second loop together with the inserted strand whereby to form a third loop encircling one of the strands of the first loop.

41. The method of tying weavers' knots which consists in engaging a thread held between two spaced points substantially midway between said points and forming a loop therein while arranging one of the strands of said loop crossed with respect to the other, drawing a bight of the crossed over strand through the main loop to form a second or temporary loop therein, inserting a second thread through the temporary loop and simultaneously severing the end thereof, and forming a third loop in the second thread while drawing it through the first loop while placing tension upon one strand of the temporary loop in the act of withdrawing it from the main loop.

42. The method of tying weavers' knots which consists in engaging a thread held between two spaced points substantially midway between said points and forming a loop therein while arranging one of the strands of said loop crossed with respect to the other, drawing a bight of the crossed over strand through the main loop to form a second or temporary loop therein, inserting a second thread through the temporary loop, and forming a third loop in the second thread while drawing it through the first loop while placing tension upon one strand of the temporary loop in the act of withdrawing it from the main loop.

43. The method of uniting two threads which consists in arranging the threads in parallel positions, seizing one of the threads to form a loop therein with one strand crossed over the other, seizing the crossed over strand and drawing it through the first loop to form a second or temporary loop, seizing the second thread and drawing it through the temporary loop, and placing tension upon one strand of the temporary loop whereby to withdraw it together with a bight of the inserted thread through the first loop in the act of forming a third loop encircling one strand of the first loop in opposed relation to the first loop.

44. The method of uniting two threads which consists first in clamping one thread to hold it at spaced points therein while severing the thread at one of said points, seizing said clamped thread between said points to form a loop therein with one strand crossed over the other, seizing the crossed over strand and drawing it through the first loop to form a second or temporary loop, clamping the second thread to hold it in position adjacent said temporary loop, seizing the second thread and drawing it through while severing the end thus seized, and finally withdrawing the temporary loop through the main loop carrying with it a bight of the second thread to form a third loop encircling said crossed over strand of the main loop.

45. A mechanism for tying weavers' knots having a loop forming means comprising a stationary hook member adapted to engage with a thread to form therein a main loop and a temporary loop, means for drawing a bight of the second thread through the temporary loop, means for placing tension upon the temporary loop to draw said bight of the second thread through the main loop of the first thread whereby to form two interengaging loops, and means for holding the thread ends during such knot forming operation, said hook member being adapted to engage with one of the thread ends while held by said holding means whereby to tighten the knot.

46. A mechanism for tying weavers' knots including a knot-forming means operable to form two opposed interengaging loops, and means for holding the threads during the knot forming operation, said knot-forming means including a hook member operable upon the completion of the formation of the said interengaging loops and while the threads are held by said holding means to place certain of said threads under tension whereby to tighten the knot.

47. In a mechanism for tying weavers' knots, the combination of knot-forming means including a reciprocatory hook member, and means for holding the threads during the knot forming operation, said hook member being operable after the formation of the knot into engagement with certain of the threads while held by said holding means whereby to tighten the knot.

48. In a knot tying mechanism, the combination with knot forming means, of means for holding the threads during the knot forming operation including a clamping device operable initially to clamp a thread and upon the completion of the operation of the knot-forming means to place the thread clamped thereby under increased tension.

49. In a knot tying mechanism, the combination with knot forming means, of means for holding the threads during the knot-forming operation including a clamping device initially operable to clamp a thread and upon the completion of the operation of the knot forming means to take up slack in said thread, said device comprising a stationary member and a movable member, the movable member having a roughened surface adapted to prevent slippage of the thread relative thereto.

50. A mechanism for tying weavers' knots comprising knot-forming means including a member about which the knot is formed, of means for holding the threads during the knot forming operation including a clamping device operable upon the disengagement of the knot from said member to place the thread held thereby under tension whereby to tighten the knot.

51. In a knotter, the combination with means for forming in a thread a main loop and a second loop disposed within the main loop, said means including a hook adapted to engage and hold said second loop; of means including a second hook operating through said second loop to grip a second thread and draw it through said second loop.

52. In a knotter, the combination of a pair of spaced thread clamps for holding and guiding a thread, a reciprocatory member operable between said clamps and having a hook adapted to engage said thread, and a second member projecting into the space between said clamps in a direction approximately perpendicular to said first member whereby the first member in its reciprocation may operate to form a loop in the thread with its strands engaging the second member.

53. A mechanism for tying weavers' knots having loop-forming means comprising a hook member having a reciprocatory and a rotatory movement adapted to form in a thread a loop having one strand crossed over the other, and a second loop formed in the crossed over strand and drawn through the first loop.

54. A mechanism for tying weavers' knots having loop forming means comprising a relatively flat member having a hook and mounted for reciprocatory and rotary movements whereby to engage with a thread to form a loop therein having one strand crossed over the other.

55. A mechanism for tying weavers' knots having means for forming a loop in a thread comprising a hook member, a shaft carrying said hook member, means providing a stationary support for said shaft, and means for rotating and reciprocating the shaft in said support.

56. A mechanism for tying weavers' knots having means for forming a loop in a thread comprising a hook member, a shaft carrying said hook member, means providing a support for said shaft, and means for rotating and reciprocating the shaft in said support comprising a rotary cam and a pair of levers operatively associated with the cam and said shaft.

57. A knotter having knot forming means including a post, means providing a yoke in which said post is longitudinally slidable said yoke being mounted for lateral movement, and means operable to reciprocate said post in the yoke.

58. A knotter having knot-forming means including a post, a hook, said hook and post being mounted for longitudinal movement in directions perpendicular to each other, and means for effecting such movements of said hook and post.

59. A knotter having knot-forming means including an anchoring member and a loop forming member mounted for relative lateral movement one of said members being movable longitudinally toward and from the other.

60. A knotter having knot-forming means including an anchoring member and a loop forming member mounted for relative lateral movement, one of said members being movable longitudinally toward and from the other, and means for effecting simultaneously said lateral and longitudinal movements.

61. A knot-tying mechanism having knot-forming means including a pair of members mounted for longitudinal movements in directions substantially perpendicular to each other, one of said members being mounted for movement laterally relative to the other, and means for effecting the reciprocation of said members and a relative lateral movement between them.

62. A knot-tying mechanism having knot-forming means including a pair of members mounted for longitudinal movements in directions substantially perpendicular to each other, one of said members being mounted for movement laterally relative to the other, and means including a single cam member for effecting the reciprocation of said members and a relative lateral movement between them.

63. A knotter having loop-forming means including a hook having a shank and a hooked end portion approximately in the shape of a triangle the base of which extends transversely of the shank.

64. A knotter having a loop-forming means including a rotary hook having a substantially flat shank and a hooked end terminating in a relatively sharp point.

65. A knotter having a loop-forming member comprising a shank having a hooked end portion substantially triangular in shape and disposed transversely of the shank.

66. A knotter having means for operating upon a thread to form a substantially triangular loop therein having crossed strands, said means including a member having a shank with a hooked end also substantially triangular in form and adapted to engage with one of said crossed strands to draw a bight thereof through said loop.

67. A knotter having means for operating upon a thread to form a loop therein substantially triangular in form having crossed strands, said means including a member having a shank with a hooked end also substantially triangular in form and adapted to engage with one of said crossed strands to draw a bight thereof through said loop, and means for imparting rotational and reciprocal movements to the hook.

68. A knotter having means for operating upon a thread to form a loop therein substantially triangular in form having crossed strands, said means including a member having a shank with a hooked end also substantially triangular in form and adapted to engage with one of said crossed strands to draw a bight thereof through said loop, and means for reciprocating the hook.

69. A knotter having means for operating upon a thread to form a loop therein substantially triangular in form having one strand crossed over the other, said means including an anchoring element and a member having a hooked end also substantially triangular in form, and means for imparting rotational movements to the hook and relative lateral motion between the hook and the anchoring element.

70. A knotter having means for operating upon a thread to form a loop therein substantially triangular in form having one strand crossed over the other, said means including an anchoring element and a member having a hooked end also substantially triangular in form, and means for effecting relative movement between the hook and the anchoring element.

71. A knotter comprising, in combination, means for holding and guiding a thread, means operable upon said thread to form a main loop with one strand crossed over the other and a temporary loop out of the crossed-over strand, means for inserting a second thread through the temporary loop, and means for drawing the temporary loop with the inserted thread in the form of a third loop through the main loop while dissolving the temporary loop.

72. A knotter comprising, in combination, means for holding and guiding a thread, means operable upon said thread to form a main loop with one strand crossed over the other and a temporary loop out of the crossed-over strand, said means including a member for positioning said main loop, means for drawing a second thread through the temporary loop, means for drawing the temporary loop, together with the inserted thread, through the main loop to form the knot, and means for withdrawing said member from the knot.

73. A knotter comprising, in combination, means for holding and guiding a thread, means for forming a main loop and a temporary loop in said thread including a hook adapted to grasp the thread, and thread-positioning means operatively associated with said hook, means for drawing a bight of a second thread through said temporary loop, and means for drawing said temporary loop together with said bight of the inserted thread through the main loop whereby to form a weaver's knot.

74. A knotter comprising, in combination, a thread clamping and shearing device, a second thread clamping device mounted in spaced relation with reference to the first device but adapted to clamp the thread only, means for forming a main loop with one strand crossed over the other and a second loop formed in the crossed-over strand, a clamping and shearing device operable through the second loop of said knot and adapted to grasp a second thread to shear off the end thereof and draw the thread through said second loop, means for drawing said second loop together with said inserted thread through the main loop, and means for placing tension upon the threads to tighten the knot.

75. A knotter comprising, in combination, a pair of thread clamping and guiding devices, means for operating upon a thread held by said devices to form a single bowknot consisting of a main loop and a second loop drawn through the main loop, said means including a member around which the main loop is held, means for inserting a second thread through said second loop, means for tensioning the threads to draw the second loop together with the inserted thread through the main loop while held by said member, and means for withdrawing said member from the knot formed by said loops.

76. A knotter comprising, in combination, a thread clamping and shearing device and a thread clamping device, said devices being mounted in spaced relation and each comprising a pivoted arm operable to clamp a thread, means adapted to operate upon said thread to form a main loop and a temporary loop therein, a clamping and shearing device operable to seize a second thread, shear off the end thereof and insert said second thread through said temporary loop, means for drawing the temporary loop together with the inserted thread through said main loop to form the knot, and means acting upon the first mentioned thread clamping devices upon the completion of the knot to release the threads held thereby.

77. A knotter comprising, in combination, a pair of thread clamping devices, means operable upon a thread held by said devices to form a main loop and a temporary loop disposed within the main loop, said means including a hook adapted to grasp said temporary loop, a clamping and shearing device operable to seize a second thread, shear off the end thereof and insert said second thread through said temporary loop, means operable to release said temporary loop from said hook, and means for drawing the temporary loop together with the inserted thread through the main loop, the first mentioned clamping devices being operable to release the thread held thereby following the preceding operation.

78. A knotter comprising, in combination, means for holding and guiding a thread, means for forming a main loop with one strand crossed over the other and a temporary loop in said crossed-over strand, means for inserting a second thread through said temporary loop, means for drawing the temporary loop with its inserted thread through the main loop, and take-up means for maintaining the thread substantially taut during said operations.

79. A knotter comprising, in combination, a pair of thread clamping and holding devices, means operable to seize a thread held by said devices and form a main loop with one strand crossed over the other and a temporary loop formed from said crossed-over strand of the main loop, a slack-take-up device operable to tension the thread during the formation of said loops, means for inserting a second thread through said temporary loop, a second slack-take-up device operable upon said second thread to provide slack therein sufficient to permit of its insertion through said temporary loop, and means for effecting the drawing of the temporary loop together with the inserted thread through the main loop whereby to form a weaver's knot.

80. A knotter comprising, in combination, a pair of thread-clamping devices mounted in spaced relation, a hook slidable substantially midway between said devices, a pair of thread-positioning members swingable transversely of said hook, means for actuating said hook and associated parts to form a main loop and a second loop in said thread, means for inserting a second thread through the second loop, and means for drawing the second loop together with its inserted thread through the main loop.

81. A knotter comprising, in combination, a driven shaft, cam means on said shaft, means operable to form in a thread a main loop and a second loop disposed within the main loop, said means including a thread hook and a pair of thread-positioning devices operatively associated with said cam means whereby to swing transversely of said hook, means for inserting a second thread through said second loop, and means for drawing the second loop together with said inserted thread out of the main loop.

82. A knotter comprising, in combination, a driven shaft, actuating means on said shaft including a cam, means operable to form in a thread a main loop and a second loop drawn through the main loop, said means including a thread hook and a pair of thread-positioning devices operatively associated with said cam whereby to swing transversely of said hook, means for inserting a second thread through said second loop, and means for drawing the second loop together with said inserted thread through the main loop, said thread hook being operatively associated with said actuating means whereby to reciprocate the hook so as to form said loops.

83. A knotter comprising, in combination, a driven shaft, actuating means on said shaft, means operable to form in a thread a main loop and a second loop entered through the main loop, said means including a thread hook and a pair of thread-positioning devices operatively associated with said actuating means whereby to swing transversely of said hook, means for inserting a second thread through said second loop, and means for drawing the second loop together with said inserted thread through the main loop, one of said thread-positioning devices including a member around which the main loop is held during said clamping operation.

84. A knotter comprising, in combination, a driven shaft, actuating means on said shaft, means operable to form a main loop and a second loop including a thread hook and a pair of thread-positioning devices operatively associated with said actuating means whereby to swing transversely of said hook, means for inserting a second thread through said second loop, and means for drawing the second loop together with said inserted thread through the main loop, and slack-take-up means operatively associated with said actuating means and adapted at all times to maintain the thread substantially taut.

85. A knotter comprising, in combination, a shaft, cam means on said shaft, a pair of thread clamping and guiding means each operatively associated with said cam means, a thread hook adapted to engage a thread held by said clamping devices, thread-positioning members operable transversely of said hook, said hook and members being each operatively associated with said cam means, means also arranged to be actuated by one of said cam means to seize a second thread and draw it into association with the first thread, and means for tensioning the threads.

86. A knotter comprising, in combination, a shaft, means operable upon a thread to form therein a main loop having one strand crossed over the other and a second loop formed in the crossed-over strand and passed through the main loop, and means adapted to insert a second thread through the second loop, the first mentioned means being adapted to draw the second loop with its inserted thread through the main loop, and cam means on said shaft for said operating means.

87. A knot-tying mechanism comprising, in combination, a driven shaft, cam means actuated by said shaft, devices operatively associated with said cam means and operable in the rotation thereof to seize a thread and form a main loop with one strand crossed over the other and a secondary loop formed in the crossed-over strand within the main loop, means also operatively associated with said cam means and operable to seize a second thread and draw it through the secondary loop of said knot, and means for drawing the inserted thread with the secondary loop through the main loop to form a weaver's knot.

88. A knot-tying mechanism comprising, in combination, a driven shaft, cam means mounted on said shaft, thread holding and guiding means, devices operable in the rotation of said cam means to grasp said thread and form a loop having one strand crossed over the other with a secondary loop therein passing through the first loop, means for seizing a second thread and drawing it through the first loop, and means for tensioning the threads to withdraw the secondary loop from the first loop and thereby draw the inserted thread through the first loop.

89. A knotter comprising, in combination, a reciprocatory hook, a pair of thread-engaging and positioning members, and means for actuating said hook and said members whereby the hook moves first into engagement with a thread to loop it and thence into engagement with one strand of the loop to draw it around the other strand and through said loop to form a second loop.

90. In a knotter, the combination of a reciprocatory member and a pair of thread-positioning members, and means for actuating said members whereby said reciprocatory member when moving in one direction is adapted to engage with a thread to form a loop therein and when moving in the opposite direction is adapted to engage one of the strands of the loop while the loop slides over the reciprocatory member permitting it to draw said strand through the loop when the latter is stripped from the reciprocatory member.

91. A knotter comprising, in combination, a hook operable upon a thread to form a loop therein with one strand crossed over the other and a second loop formed in the crossed strand and disposed within the other loop, means for inserting a second thread through the inner loop, and means for drawing said inner loop with the inserted thread in the form of a loop entirely through the outer loop, said outer loop being adapted to coact with the loop in said inserted thread to form the weaver's knot.

92. A knotter comprising, in combination, a hook operating upon a thread to form a main loop with one strand crossed over the other and a second loop formed in the crossed strand and drawn through the main loop, means operable to associate a second thread with said second loop, and means for drawing said second loop together with a bight of the second thread through the main loop whereby to produce a third loop adapted to interengage with the first loop to form a weaver's knot.

93. A knotter comprising, in combination, means for holding and guiding a thread, means for operating upon said thread to form a loop therein with one strand crossed over the other, an element with which said loop engages, means for holding and guiding a second thread, and means operable to draw the second thread in the form of a loop into operative association with the loop of the first thread while held by said element, whereby to form a weaver's knot.

94. A knotter comprising, in combination, means for guiding and holding two threads in substantially parallel relation, means operable to form a loop in one of said threads with one strand crossed over the other and having a second loop formed in the crossed strand and disposed within the first loop, means operable upon the second thread to form a bight therein engaging in the second loop of the first thread, and means for tensioning said strand of the first thread whereby to draw said second loop together with the bight of the second thread therein through said first loop to form a weaver's knot.

95. A knotter comprising, in combination, means for holding and guiding a pair of threads to be united in spaced substantially parallel relation, a device adapted to reciprocate transversely of said threads, means for positioning one of said threads for engagement by said device whereby the latter is capable of forming therein a main loop having one strand crossed over the other, a second loop formed in the crossed strand and passing through the main loop, a second reciprocatory device operable transversely of the first reciprocatory device and adapted to engage the other one of said threads and draw it through said second loop, and means operable to draw a bight of said second thread together with said second loop through said first loop to form a weaver's knot.

96. A knotter having means adapted to engage with a thread to form a main loop having two strands one of which crosses the other, and a second loop formed in the crossed strand of the main loop and drawn through the main loop; means including a hook for drawing a second thread through the temporary loop; and means for drawing the temporary loop together with the inserted thread through the main loop to form a third loop disposed oppositely with respect to the main loop.

97. A knotter having means adapted to engage with a thread to form a main loop therein having crossed strands and a temporary loop within the main loop, said temporary loop being formed in one of the strands of the main loop after first passing around the other strand and thence through the main loop, a hook for drawing a second thread through the temporary loop, and means for placing tension on the first thread to draw the temporary loop together with the inserted thread through the main loop.

98. The method of forming a weaver's knot which consists in first forming a loop in a thread, drawing one strand of said loop around an anchoring element and then looped or doubled upon itself through the first loop, inserting a second thread through said looped strand, and finally withdrawing the looped strand from the first loop with the second thread around it and the strands of the second thread forming a second loop passing through the first loop.

99. In a knotter, a thread clamp comprising a stationary plate, a second plate yieldingly mounted in spaced relation with reference to the first plate, an arm operable into the space between said plates so as to grip a thread, means operable to swing said arm in one direction, and spring means adapted to swing the arm in the opposite direction.

100. In a knotter, the combination with a reciprocatory thread-engaging device, of means for holding a thread in position for engagement by said device in its reciprocation, said means including a pair of clamps for holding and guiding a thread, and a member operable between said clamps transversely of the plane of movement of the said device whereby said device is operable to form a loop in said thread around said member, and means for withdrawing said member from said loop.

101. In a knotter, a member around which a thread is looped, loop forming means, a pivoted arm in which said member is mounted for sliding movement, means for swinging said arm to position said member with reference to the loop forming means, and means operable to withdraw said member from the knot at a predetermined time.

102. In a knotter, the combination with a projecting member, of means for operating upon a thread to form a loop therein with both strands thereof engaging with said member and one strand crossed over the other, the first mentioned means being operable to engage with said crossed strand to draw it around said member and through the first loop, and means operable to insert a second thread through said second loop and draw it through the first loop to form a weaver's knot.

103. In a knotter, a projecting element, means for operating upon a thread to form a main loop therein having one strand crossed over the other with both strands doubled around said element, and a second loop formed in the crossed strand of the main loop and drawn through the main loop, and means operable upon a second thread to insert it in the second loop and draw it together with the second loop through the first loop to form a weaver's knot.

104. In a knotter, the combination with a projecting element, means for operating upon a thread to form a loop therein having crossed strands and a second loop formed in one of said strands and drawn around said element through the first loop, means for operating upon a second thread including means to insert it in said second loop, and means to draw the second loop together with the inserted strand through the main loop while the latter is held stationary by said element.

105. In a knotter, the combination of a projecting element, a reciprocatory device operable upon the thread to form a loop therein with both strands engaging said element and the strands of said loop in crossed relation, said device being operable to draw a second loop around said element and through the first loop, and means for operating upon a second thread to insert it through the second loop and draw the second loop together with said inserted thread through the first loop to form a weaver's knot.

106. In a knotter, the combination with a pair of threads to be united and a pin-like element, of means for operating upon one of said threads to form a loop therein with both strands of the loop engaging with said element and the strands in crossed relation, said first mentioned means being operable to draw one of said crossed strands through the first loop to form a second loop, means operable upon the other one of said strands to insert it in said second loop and draw it together with said second loop through the first loop to form a weaver's knot, and means for tensioning the threads to draw said loops in operative association around said element to tighten said knot.

107. In a knotter, the combination with a pin-like element, means for operating upon a thread to form a loop therein, and a second loop formed in one strand of the first loop and drawn around the other strand and said stationary element through the first loop, and means for operating upon a second thread to insert it in said second loop and draw it together with said second loop through said first loop while the latter is held relatively stationary by said element, whereby to form a weaver's knot.

108. In a knotter, the combination with an element having a projecting end, means for operating upon a thread to form a loop therein and a second loop in one strand of the first loop and drawn around the other strand and said stationary element through the first loop, means for operating upon a second thread to insert it in said second loop and draw it together with said second loop through said first loop while the latter is held relatively stationary by said element, whereby to form a weaver's knot, and means for withdrawing said element from said knot.

109. A weaver's knotter having, in combination, a knot-anchoring pin with a tapering point of substantial length, means operating to form in two threads a pair of loops partially surrounding said pin with both strands of one loop pasing through the other loop and with the strands of said other loop crossed with respect to each other and one of such crossed strands inserted through the first mentioned loop, means operating to place tension upon said threads, and means acting simultaneously with said tensioning means to withdraw said pin from the loops.

110. The method of uniting two threads which consists in forming a loop in one thread with the strands of the loop passing partially around an anchoring element and with one strand crossed over the other, drawing the crossed strand through said loop to form a second loop, inserting the other one of said threads through the first loop, drawing the second loop together with the inserted strand through the first loop and around said anchoring element, and placing tension upon the threads to draw said loops together while withdrawing them from the anchoring element.

111. The method of uniting two threads which consists in forming two interengaging opposed loops in the two threads about an anchoring element and at opposite sides thereof, and simultaneously placing tension upon the threads and withdrawing the loops from the anchoring element whereby to draw the two loops into proper interengaging relation.

112. The method of forming a weaver's knot which consists in forming the two interengaging loops to compose the knot about a pin of relatively small diameter with the two loops disposed on opposite sides of the pin, and simultaneously placing tension on the threads and effecting withdrawal of the knot from the pin.

113. The method of forming a weaver's knot which consists in forming the two opposed interengaging loops to compose the knot about the tapering point of a pin with the axis of the pin passing between the two loops, and effecting the withdrawal of the pin from said loops while placing tension upon the latter to draw them into taut relation.

114. The method of forming a weaver's knot which consists in first forming in one thread a main loop about an anchoring element with one strand of the loop crossed over the other, then drawing a bight of the crossed-over strand through the main loop, inserting a second thread through said bight, and finally withdrawing said bight with the inserted strand through the main loop to form about the anchoring element a second loop passing through the main loop and disposed oppositely relatively thereto.

115. A weaver's knotter comprising, in combination, an anchoring pin having one end gradually tapering to a point, means operating to form in two threads a pair of interengaging loops disposed upon opposite sides of said pin, and means acting to effect the withdrawal of said loops from the pin while simultaneously drawing the loops in opposite directions to tighten the knot.

116. A knotter having, in combination, an anchoring element and means operable to engage a thread to form a loop therein with one strand crossed over the other on one side of said element, said means being further adapted to draw a bight of the crossed-over strand around said element so as to form an anchoring loop containing said element and thence through the first loop.

117. A knotter having, in combination, an anchoring element and means operable to engage one strand of a thread loop engaging one side of the anchoring element and operating to draw a bight of the engaged strand around said element and through said loop thereby forming an anchoring loop containing said element.

118. The method of forming a weaver's knot which consists in forming in one thread a main loop about an anchoring element and simultaneously crossing one strand of said loop over the other, then drawing a bight of the crossed-over strand through the main loop, inserting a second thread through said bight, and finally withdrawing said bight with the inserted strand through the main loop to form about the anchoring element a second loop passing through the main loop and disposed oppositely relative thereto.

In testimony whereof, I have hereunto affixed my signature.

BURT A. PETERSON.